(12) United States Patent
Hashimoto et al.

(10) Patent No.: US 11,954,247 B2
(45) Date of Patent: Apr. 9, 2024

(54) HEAD MOUNTED DISPLAY APPARATUS

(71) Applicant: MAXELL, LTD., Kyoto (JP)

(72) Inventors: Yasunobu Hashimoto, Kyoto (JP); Kazuhiko Yoshizawa, Kyoto (JP); Mayumi Nakade, Kyoto (JP); Hitoshi Akiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/620,935

(22) PCT Filed: Jun. 21, 2019

(86) PCT No.: PCT/JP2019/024749
§ 371 (c)(1),
(2) Date: Dec. 20, 2021

(87) PCT Pub. No.: WO2020/255384
PCT Pub. Date: Dec. 24, 2020

(65) Prior Publication Data
US 2022/0357793 A1 Nov. 10, 2022

(51) Int. Cl.
*G06F 3/01* (2006.01)
*G02B 27/01* (2006.01)
(Continued)

(52) U.S. Cl.
CPC ......... *G06F 3/012* (2013.01); *G02B 27/0172* (2013.01); *G06F 3/0346* (2013.01);
(Continued)

(58) Field of Classification Search
CPC ........ G06F 3/012; G06F 3/0346; G06F 1/163; G02B 27/01; G02B 27/0172;
(Continued)

(56) References Cited

U.S. PATENT DOCUMENTS 5,812,257 A * 9/1998 Teitel ................. G01S 7/06
342/463
6,757,068 B2 * 6/2004 Foxlin ................. G06F 3/0421
356/139.03
(Continued)

FOREIGN PATENT DOCUMENTS

JP 2001-208529 A 8/2001
JP 2014-093703 A 5/2014
(Continued)

OTHER PUBLICATIONS

International Search Report of PCT/JP2019/024749 dated Aug. 27, 2019.

*Primary Examiner* — Mihir K Rayan
(74) *Attorney, Agent, or Firm* — Mattingly & Malur, PC

(57) ABSTRACT

Provided regarding a technique of an HMD is a technique capable of realizing high functionality and weight reduction in a well-balanced manner and improving usability for a user. An HMD of an embodiment is a head mounted display apparatus, includes: a head attached part that is attached to a user's head and has a display screen for displaying an image; and a body trunk attached part communicating with the head attached part and attached to a portion of the user's body trunk, measures a relatively positional relationship between the head attached part and the body trunk attached part and grasps states including a position and a direction of the head attached part states including a position and a direction of the body trunk attached part based on the positional relationship.

16 Claims, 22 Drawing Sheets

(51) Int. Cl.
*G06F 1/16* (2006.01)
*G06F 3/0346* (2013.01)

(52) U.S. Cl.
CPC .............. *G02B 2027/0138* (2013.01); *G02B 2027/014* (2013.01); *G02B 2027/0178* (2013.01); *G06F 1/163* (2013.01)

(58) Field of Classification Search
CPC ...... G02B 2027/0138; G02B 2027/014; G02B 2027/0178
See application file for complete search history.

(56) References Cited

U.S. PATENT DOCUMENTS

| | | | | |
|---|---|---|---|---|
| 10,162,177 | B2* | 12/2018 | Pedrotti | G02B 27/0149 |
| 11,086,126 | B1* | 8/2021 | Gollier | G02B 27/0172 |
| 11,294,565 | B2* | 4/2022 | VanBlon | G06F 1/1652 |
| 11,416,075 | B1* | 8/2022 | Gong | G01S 5/18 |
| 11,506,901 | B2* | 11/2022 | Wang | G06T 7/579 |
| 11,507,179 | B2* | 11/2022 | Lefaudeux | G06V 40/103 |
| 2014/0125579 | A1* | 5/2014 | Yamamoto | G06F 3/0308 |
| | | | | 359/630 |
| 2017/0083084 | A1* | 3/2017 | Tatsuta | G06F 3/011 |
| 2018/0137359 | A1* | 5/2018 | Dayal | G06V 10/70 |
| 2019/0094966 | A1* | 3/2019 | Kulkarni | G06T 19/006 |
| 2019/0286224 | A1* | 9/2019 | De Nardi | G06F 3/011 |
| 2020/0162140 | A1* | 5/2020 | Tusi | H04W 4/38 |

FOREIGN PATENT DOCUMENTS

| | | |
|---|---|---|
| JP | 2019-028638 A | 2/2019 |
| WO | 2016/002318 A1 | 1/2016 |

* cited by examiner

DISPLAY SYSTEM INCLUDING HMD

1A: HEAD ATTACHED PART
1B: NECK ATTACHED PART
4: CONNECTING LINE
5: DISPLAY SURFACE
6: CAMERA
7: DISTANCE MEASURING SENSOR

8: MICROPHONE
9: SPEAKER
10, 11, 12: HOUSING
13: MARKER PORTION
14: OPERATION INPUT UNIT
17: MARKER

FIG. 5
(A)
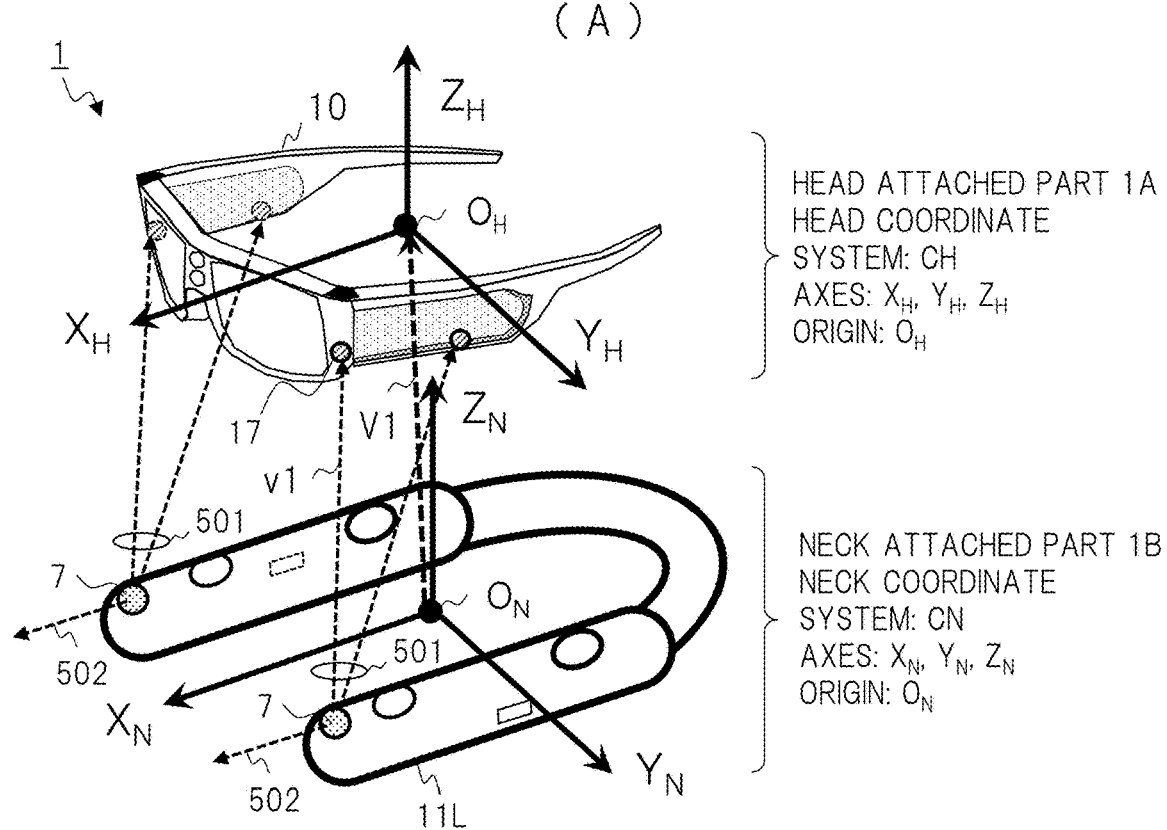
HEAD ATTACHED PART 1A
HEAD COORDINATE
SYSTEM: CH
AXES: $X_H$, $Y_H$, $Z_H$
ORIGIN: $O_H$
NECK ATTACHED PART 1B
NECK COORDINATE
SYSTEM: CN
AXES: $X_N$, $Y_N$, $Z_N$
ORIGIN: $O_N$
(B)
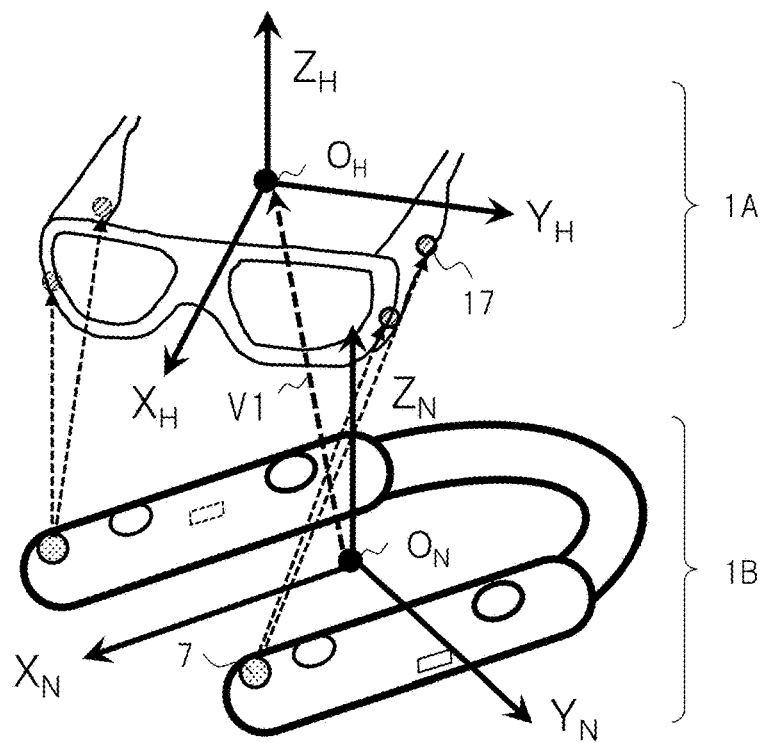

FIG. 8
(A)
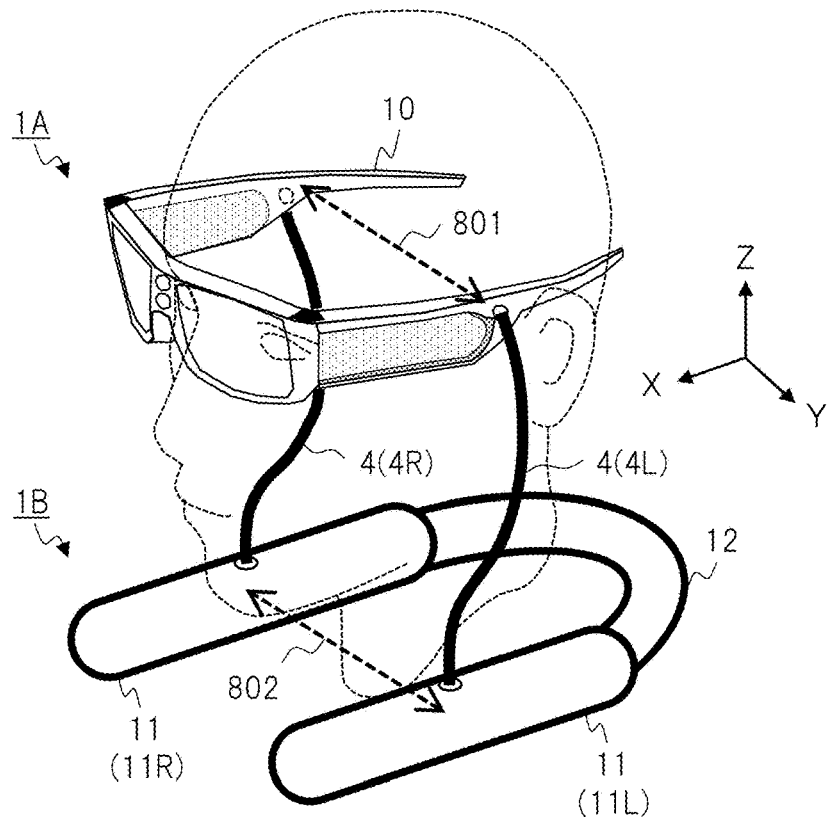
(B)
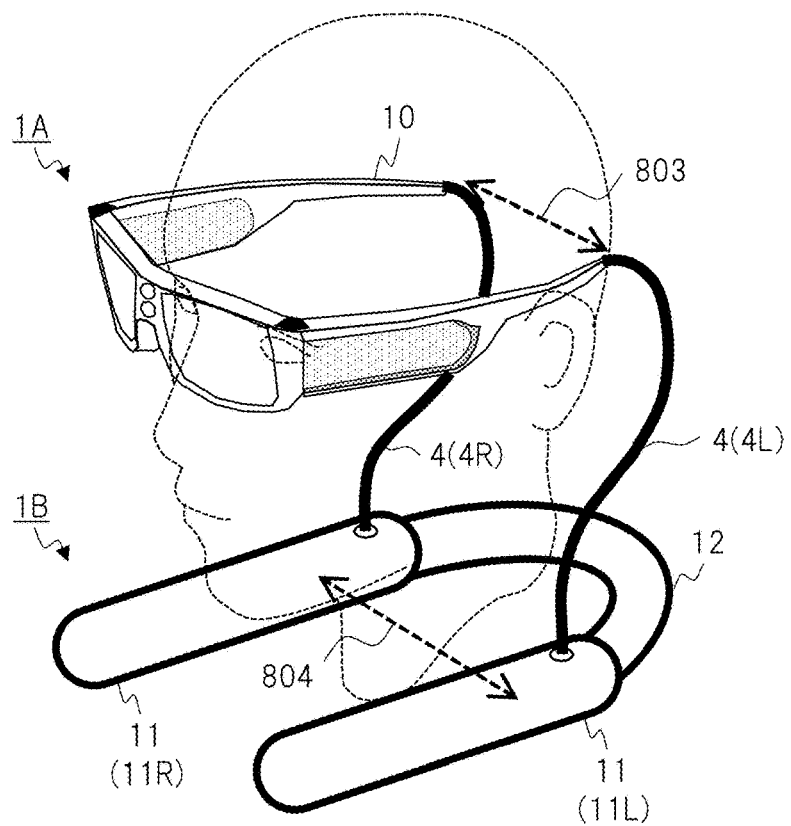

FIG. 9
(A)
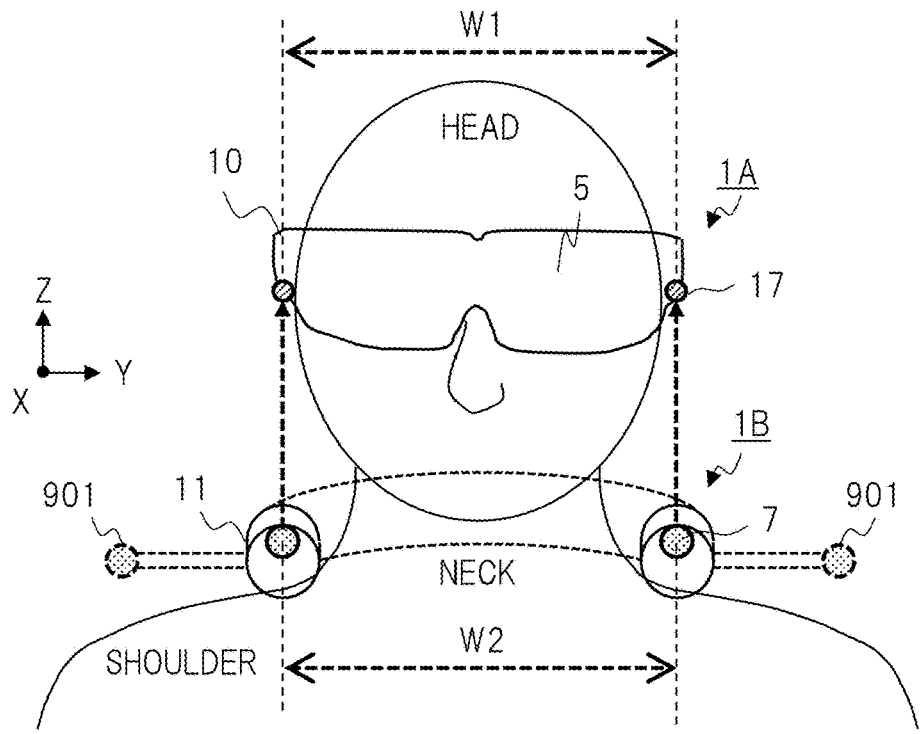
(B)
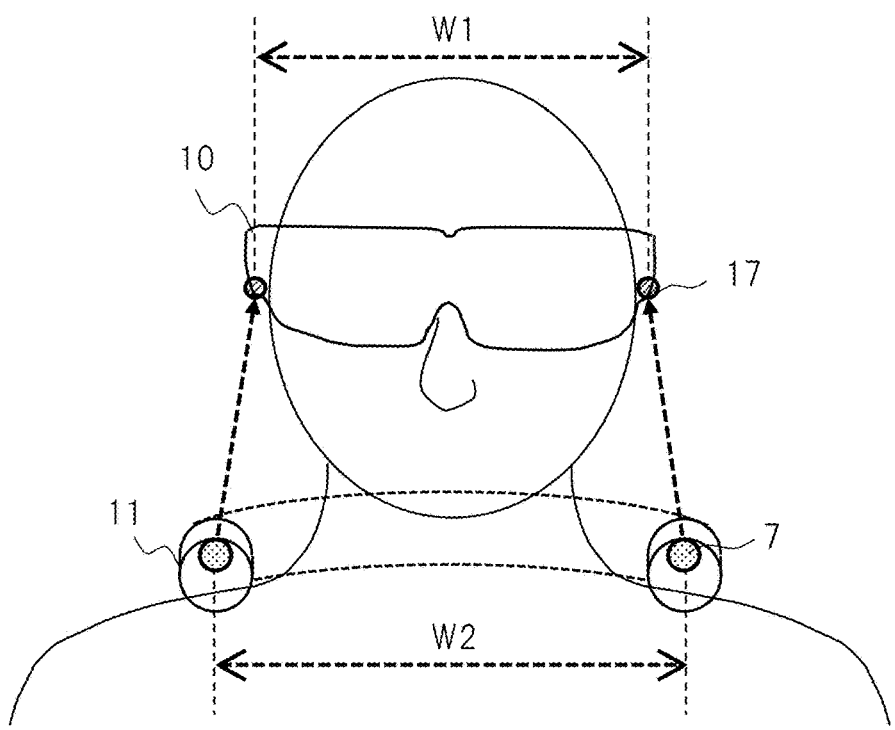

FIG. 10

| | DISTANCE MEASURING SENSOR | POSITION / ATTITUDE SENSOR | CAMERA | BATTERY | ...... |
|---|---|---|---|---|---|
| FIRST EMBODIMENT | | | | | |
| HEAD ATTACHED PART 1A | × (ABSENT) | × | ○ | △ (SUB) | |
| NECK ATTACHED PART 1B | ○ (PRESENT) | ○ | × | ○ (MAIN) | |

| | DISTANCE MEASURING SENSOR | POSITION / ATTITUDE SENSOR | CAMERA | BATTERY | ...... |
|---|---|---|---|---|---|
| FIRST MODIFICATION EXAMPLE | | | | | |
| HEAD ATTACHED PART 1A | × | × | × | × | |
| NECK ATTACHED PART 1B | ○ | ○ | ○ | ○ | |

| | DISTANCE MEASURING SENSOR | POSITION / ATTITUDE SENSOR | CAMERA | BATTERY | SUPPLEMENT |
|---|---|---|---|---|---|
| SECOND MODIFICATION EXAMPLE | | | | | |
| HEAD ATTACHED PART 1A | ○ ※1 | × | ○ | × | ※1: NORMALLY |
| NECK ATTACHED PART 1B | ○ ※2 | ○ | × | ○ | ※2: FOR POSITIONAL RELATIONSHIP MEASUREMENT |

| | DISTANCE MEASURING SENSOR | POSITION / ATTITUDE SENSOR | CAMERA | BATTERY | SUPPLEMENT |
|---|---|---|---|---|---|
| THIRD MODIFICATION EXAMPLE | | | | | |
| HEAD ATTACHED PART 1A | × | △ ※1 | ○ | × | ※1: ACCELERATION SENSOR, ANGULAR VELOCITY SENSOR |
| NECK ATTACHED PART 1B | ○ | △ ※2 | × | ○ | ※2: GEOMAGNETIC SENSOR, GPS RECEIVER |

| | DISTANCE MEASURING SENSOR | POSITION / ATTITUDE SENSOR | CAMERA | BATTERY | SUPPLEMENT |
|---|---|---|---|---|---|
| FOURTH MODIFICATION EXAMPLE | | | | | |
| HEAD ATTACHED PART 1A | × | △ ※1 | ○ | △ | ※1: SUB, LIGHTWEIGHT |
| NECK ATTACHED PART 1B | ○ | ○ ※2 | × | ○ | ※2: MAIN, HIGH ACCURACY |

FIG. 11

D21 — DISPLAY INFORMATION

T01: DISPLAY OBJECT INFORMATION TABLE

| OBJECT ID | DISPLAY COORDINATE SYSTEM | ARRANGEMENT COORDINATE | ARRANGEMENT DIRECTION |
|---|---|---|---|
| A | WORLD COORDINATE SYSTEM CW | $X_A, Y_A, Z_A$ | $Q_A$ |
| B | HEAD COORDINATE SYSTEM CH | $X_B, Y_B, Z_B$ | $Q_B$ |
| C | NECK COORDINATE SYSTEM CN | $X_C, Y_C, Z_C$ | $Q_C$ |
| D | INTERNAL COORDINATE SYSTEM CI | $X_D, Y_D, Z_D$ | $Q_D$ |

D22 — COORDINATE SYSTEM INFORMATION

T02: COORDINATE SYSTEM INFORMATION TABLE

| COORDINATE SYSTEM ID | ORIGIN POSITION | FRONT DIRECTION |
|---|---|---|
| WORLD COORDINATE SYSTEM CW | $G1 = (X_W, Y_W, Z_W)$ | DIR1 |
| HEAD COORDINATE SYSTEM CH | $G2 = (X_H, Y_H, Z_H)$ | DIR2 |
| NECK COORDINATE SYSTEM CN | $G3 = (X_N, Y_N, Z_N)$ | DIR3 |
| INTERNAL COORDINATE SYSTEM CI | $G4 = (X_I, Y_I, Z_I)$ | DIR4 |

| SECOND EMBODIMENT | DISTANCE MEASURING SENSOR | POSITION / ATTITUDE SENSOR | CAMERA | BATTERY | ...... |
|---|---|---|---|---|---|
| HEAD ATTACHED PART 1A | ○ | × | ○ | × | |
| NECK ATTACHED PART 1B | × | ○ | × | ○ | |

| THIRD EMBODIMENT | DISTANCE MEASURING SENSOR | POSITION / ATTITUDE SENSOR | CAMERA | BATTERY | SUPPLEMENT |
|---|---|---|---|---|---|
| HEAD ATTACHED PART 1A | × | ○ ※1 | ○ | △ | ※1:INCLUDING ACCELERATION SENSOR AND GEOMAGNETIC SENSOR |
| NECK ATTACHED PART 1B | ○ | ○ ※2 | × | ○ | ※2:INCLUDING ACCELERATION SENSOR AND GEOMAGNETIC SENSOR |

FIG. 15
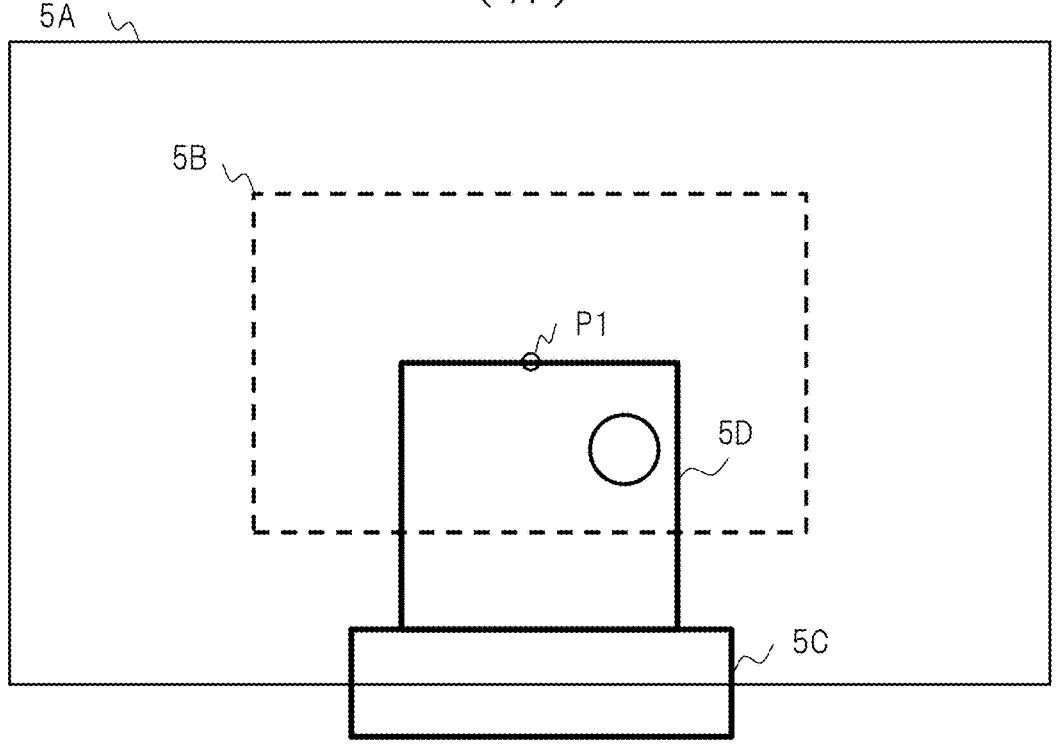
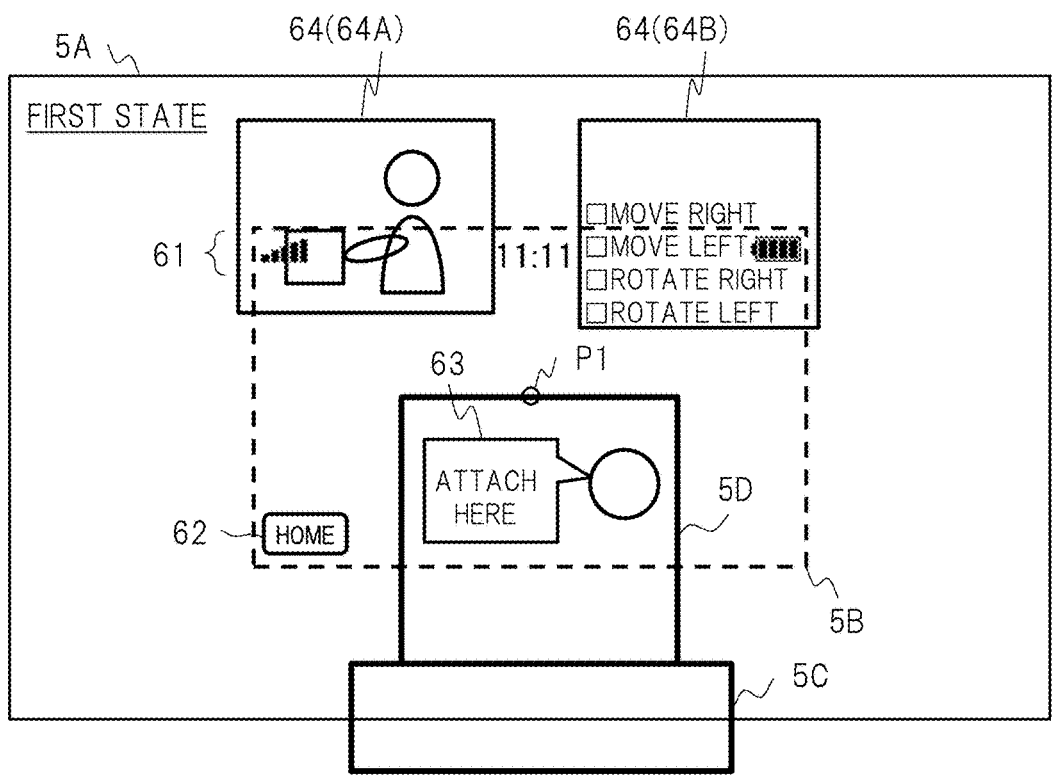

FIG. 21
(A)
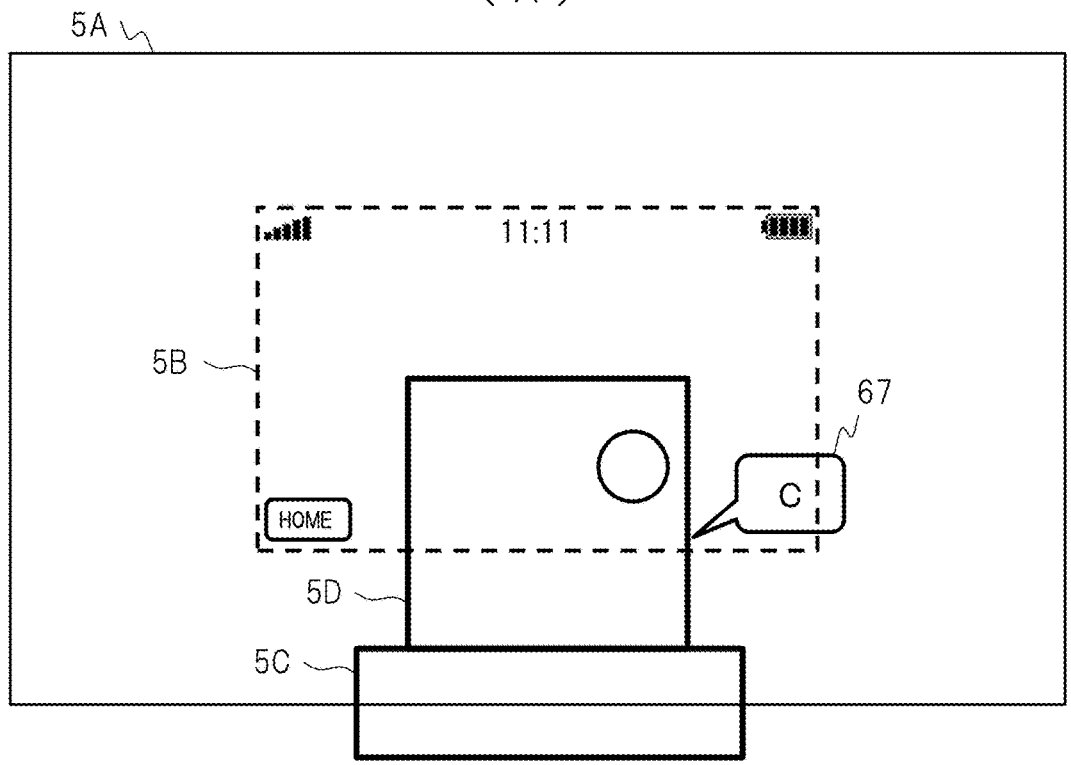
(B)
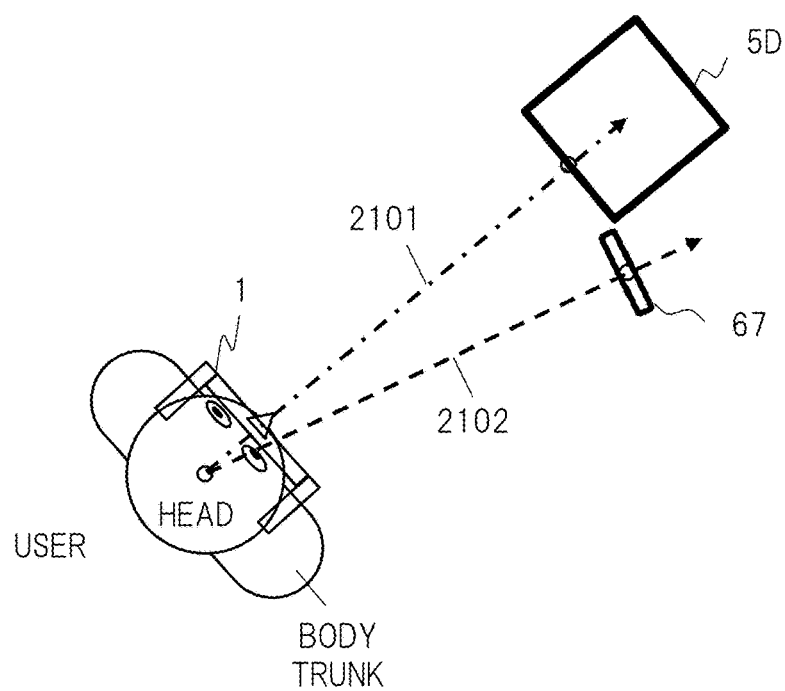

FIG. 24
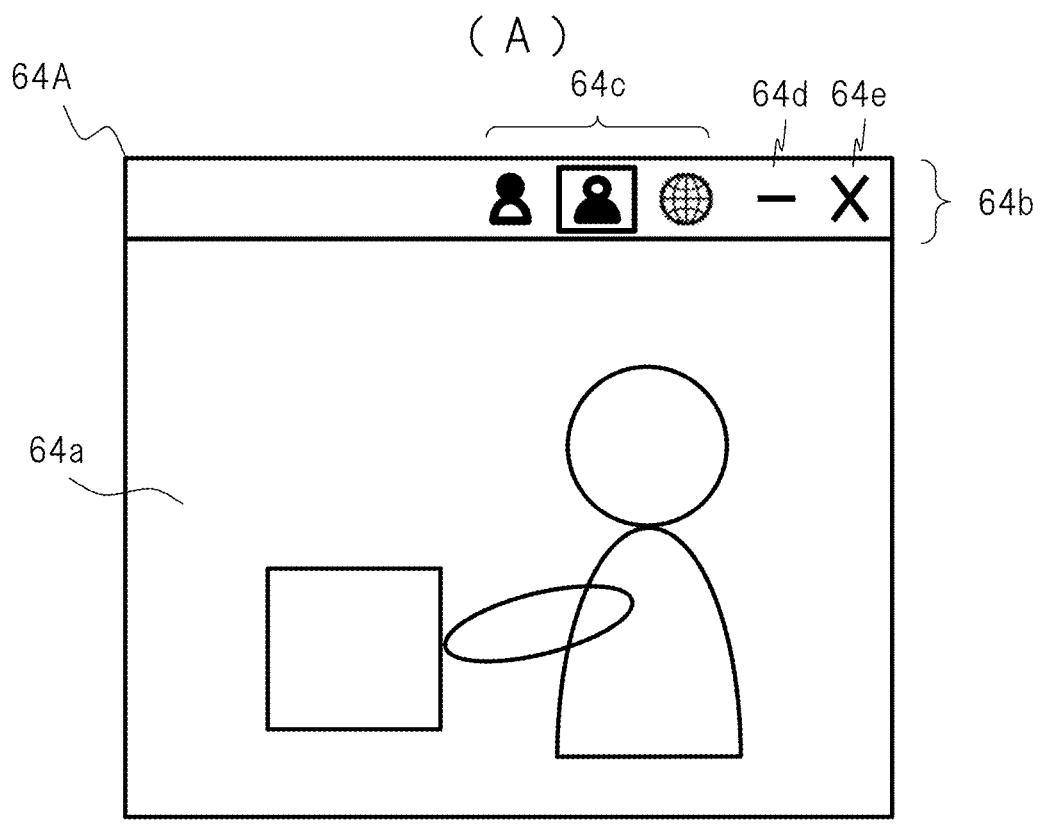
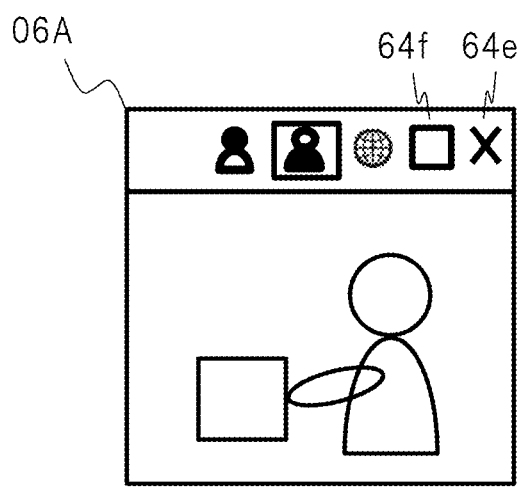

HEAD MOUNTED DISPLAY APPARATUS

TECHNICAL FIELD

The present invention relates to a technique for a head mounted display apparatus (HMD).

BACKGROUND ART

An HMD worn on a user's head can display an image of a virtual object or the like on a transparent or non-transparent type display surface. A conventional HMD has, as a method of displaying an image on a display surface, a method of displaying the image at a position aligned with a world coordinate system or a method of displaying the image at a position aligned with a direction of a user's head (corresponding HMD). Further, as another method, a method of displaying the image at a position aligned with a direction of a body trunk such as a user's body has also been proposed.

As an example of a conventional technique related to the HMD, Japanese Patent Application Laid-Open No. 2019-28638 (Patent Document 1) is given. Patent Document 1 discloses: a head mounted display or the like that includes a head sensor for detecting a direction of a head, a body trunk sensor for detecting a direction of a body trunk, and the like; and a construction of a virtual desktop that is composed of two layers of a body trunk layer and a head layer and configures a continuous information display region in a virtual space around a wearer.

RELATED ART DOCUMENTS

Patent Documents

Patent Document 1: Japanese Patent Application Laid-open No. 2019-28638

SUMMARY OF THE INVENTION

Problems to be Solved by the Invention

Weight of the HMD tends to increase with sophistication of its function. The weight of the HMD brings an increase of physical burden on the user, thereby making it difficult to use the HMD for a long period of time, for example. In order to reduce the physical burden on the user, it is required to reduce the weight of the HMD as much as possible.

As an example of the sophistication of the HMD's function, given is a function of controlling display of an image onto a display surface according to a user's state. For example, given is a function that can use both image display aligned with a direction of the user's head and image display aligned with a direction of a body trunk. In an example of Patent Document 1, the direction of the body trunk, which is measured from a sensor attached to the body trunk of the user, is used as an image display reference. In the example of Patent Document 1, sensors such as 3-axis angular velocity sensors are provided in both the HMD of the head and the body trunk of the user so as to be able to detect two directions of the head direction and the body trunk direction.

In order to sophisticate the functions of the HMD, various devices including sensors need to be mounted. However, as the heavier devices or/and a larger number of devices are mounted, the weight of the HMD becomes heavier. In the example of Patent Document 1, the same type of sensors needs to be provided doubly, so that there is room for improvement in such a configuration from the viewpoint of effective use of the sensors. In mounting the HMD, designing in a well-balanced manner is required from the viewpoint of advanced functions and weight.

An object of the present invention is to provide, regarding a technique for a HMD, a technique that can realize advanced functions and weight reduction in a well-balanced manner and improve usability of a user. A problem etc. other than the above will be shown in embodiments for carrying out the invention.

Means for Solving the Problems

A typical embodiment of the present invention has the following configurations. A head mounted display apparatus of one embodiment is a head mounted display apparatus capable of displaying an image in a user's field of view, and it includes: a head attached part that is attached to a user's head and has a display surface for displaying the image; and a body trunk attached part that communicates with the head attached part and is attached to a part of the user's body trunk, calculates a relatively positional relationship between the head attached part and the body trunk attached part, and grasps, based on the positional relationship, states including a position and a direction of the head attached part and states including a position and a direction of the body trunk attached part.

Effects of the Invention

According to a typical embodiment of the present invention, the advanced functions and the weight reduction can be realized in a well-balanced manner, and the user's usability can be improved.

BRIEF DESCRIPTION OF THE DRAWINGS

FIG. 5 is a view showing a coordinate system, distance measurement of a positional relationship, and the like in the HMD according to the first embodiment;

FIG. 8 is a view showing a configuration example about a connecting line in the HMD according to the first embodiment;

FIG. 9 is a view showing a configuration example about a width of a housing in the HMD according to the first embodiment;

FIG. 10 is a view showing a configuration example of separating components in the HMD according to the first embodiment;

FIG. 11 is a view showing configuration examples of display information and coordinate system information in the HMD according to the first embodiment;

FIG. 15 is a view showing a first state and the like of a first display control example in an HMD according to a fifth embodiment of the present invention;

FIG. 21 is a view showing a third display control example in the HMD according to the fifth embodiment;

FIG. 24 is a view showing, as a fourth display control example, a setting example in a display coordinate system of a work tool in the HMD according to the fifth embodiment.

DETAILED DESCRIPTION OF PREFERRED EMBODIMENTS

Figure 1:
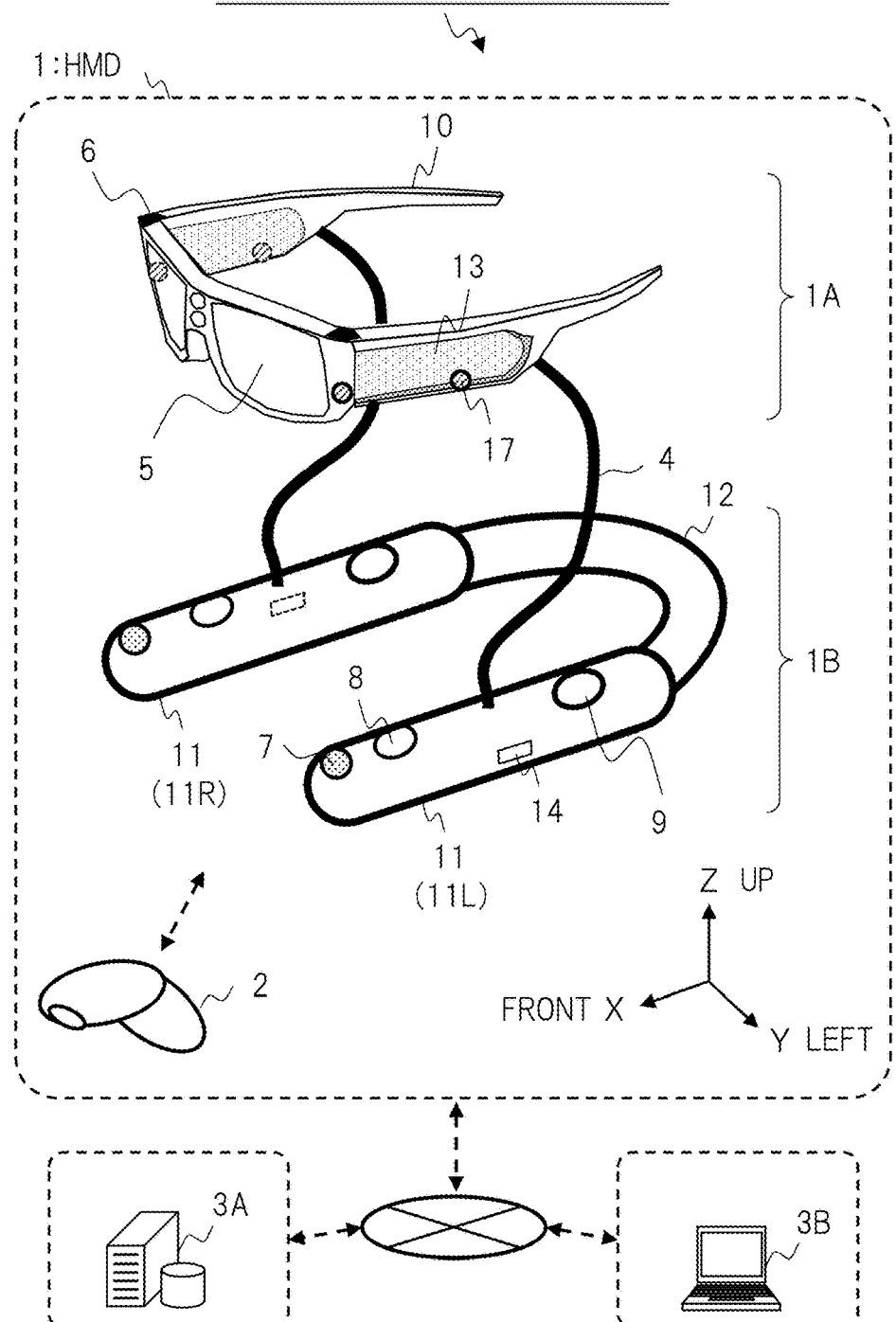
FIG. 1 is a view showing a configuration of a display system including a head mounted display apparatus (HMD) according to a first embodiment of the present invention.

Hereinafter, embodiments of the present invention will be described in detail based on the drawings.

First Embodiment

A head mounted display apparatus (HMD) according to a first embodiment of the present invention will be described with reference to FIGS. 1 to 11.

An HMD according to a first embodiment has a separate type configuration, and is roughly configured by two parts of a head attached part and a neck attached part. Components of an HMD function are mounted separately in these two parts. For example, a display device is mounted on the head attached part, and a main sensor group, a controller, a battery, and the like are mounted on the neck attached part. Such a separate type configuration makes it possible to reduce the number of devices mounted on the head attached part and omit mounting at least some of the sensor group required for advanced functions onto the head attached part. Consequently, this HMD can reduce weight of the head attached part attached to a user's head as compared with a conventional HMD. Therefore, this HMD makes a wearing feeling of a user better and also makes use thereof easy for a long time.

Further, in this HMD, a position and a direction (corresponding posture) of the neck attached part, and a position and a direction (corresponding posture) of the head attached part can be independently changed according to movement of the user. Therefore, this HMD has a means for measuring a relatively positional relationship between the neck attached part and the head attached part. As an example of such a means, this HMD has a distance measuring sensor on the neck attached part, and measures a position and a direction of the head attached part from the neck attached part. Then, this HMD uses a measured positional relationship to grasp both states such as the position and the direction of the neck attached part and states such as the position and the direction of the head attached part based on calculation of rotation and the like of a coordinate system.

This HMD uses the above positional relationship to be able to correct and convert a state (corresponding sensor data etc.) detected by a sensor of one of the head attached part or the neck attached part to and into a state (corresponding sensor data etc.) in a coordinate system of the other of the head attached part or the neck attached part. That is, this HMD can convert, by using the positional relationship, a state in a head coordinate system, which is detected by a sensor of the head attached part, into a state in a neck coordinate system of the neck attached part. Further, this HMD can convert, by using the positional relationship, a state in the neck coordinate system, which is detected by a sensor of the neck attached part, into a state in the head coordinate system of the head attached part.

By such a configuration, the HMD according to the first embodiment can detect both the head direction (corresponding head-attached-part direction) and the body trunk direction (corresponding neck-attached-part direction) of the user, and can display and control a virtual object obtained by using each of the two directions. For example, in this HMD, used in combination can be displaying an image at a position aligned with the head direction in the head coordinate system and displaying an image at a position aligned with the body trunk direction in the neck coordinate system. Such advanced functions make it possible to improve convenience such as work support of the user.

In the HMD according to the first embodiment, a position/attitude sensor is particularly mounted on not the head attached part but the neck attached part. This position/attitude sensor is a sensor that detects a position and a direction (corresponding posture) with reference to the body trunk including the neck and shoulders, in other words, a sensor that detects the state in the neck coordinate system. The state detected by this sensor is different from a state with reference to the head (corresponding head attached part and head coordinate system) as it is. Therefore, this HMD obtains a state with reference to the head coordinate system by calculating the coordinate system from the state detected by the neck attached part based on the above positional relationship.

[Display System]

FIG. 1 shows a configuration of a display system including an HMD 1 according to the first embodiment. In the HMD 1, a head attached part 1A and a neck attached part 1B are connected by connecting lines 4. The head attached part 1A and the neck attached part 1B are connected so as to be capable of communication and power feeding by the connecting lines 4 which are cables. Although not shown in FIG.

1, there is a user's body attaching the HMD 1. The head attached part 1A is attached to the user's head, and the neck attached part 1B is attached near a user's neck and shoulders. As an option, the HMD 1 may accompany an operating tool 2 which is a remote controller. The user can operate the HMD 1 with the operating tool 2 held in his hand. For example, the neck attached part 1B and the operating tool 2 perform short-range wireless communication. The HMD 1 may communicate with an external device. For example, the HMD 1 may be connected to a server 3A of a business operator, a PC 3B at home, or the like via a communication network. Incidentally, separately from the coordinate system, X, Y, and Z directions may be used as explanatory directions. The X direction corresponds to a front-back direction with respect to the user's body and the HMD 1. The Y direction corresponds to a right-left direction with respect to the user's body and the HMD 1. The Z direction corresponds to a up-down direction with respect to the user's body and the HMD 1.

The head attached part 1A has, for example, a spectacle-shaped housing 10, and components such as a display device including a transmissive type display surface 5 and a camera 6 are mounted on the housing 10. At a part of the housing 10, for example, near each of left and right side surfaces, a marker portion 13 for distance measurement is included, and a plurality of markers 17 serving as measurement points are formed in the marker portion 13.

The neck attached part 1B has housings 11 and a housing 12 as, for example, arc-shaped housings. The housings 11 are portions arranged at left and right positions with respect to the user's neck and shoulders, and have a right-side housing 11R and a left-side housing 11L. The housing 12 is a portion that connects the left and right-side housings 11 and that is arranged at a position behind the user's neck and shoulders. A distance measuring sensor 7, a microphone 8, a speaker 9, an operation input unit 14, and the like are mounted on each housing 11.

The HMD 1 has not a configuration in which states of a position and a direction etc. of an HMD are measured by a difference in displacement from an initial state like a conventional HMD but a configuration in which each positional relationship of a position and a direction etc. of the head attached part 1A is directly measured from the distance measuring sensor 7 of the neck attached part 1B. Consequently, the HMD 1 can omit mounting a component such as a position/attitude sensor on the head attached part 1A, and reduces weight of the head attached part 1A.

As sensors for measuring the position and the attitude in the conventional HMD, given are an acceleration sensor, an angular velocity sensor (gyro sensor), a geomagnetic sensor, a GPS receiver, a camera, and a distance measuring sensor, etc. Incidentally, these devices including a camera may be collectively referred to as a sensor. Since the acceleration sensor can measure a moving amount of the HMD and measure the gravitational acceleration vector at a time of motionlessness, it can measure an inclination of the HMD. The angular velocity sensor measures a change in directions of the HMD. The geomagnetic sensor estimates a direction of the HMD based on detection of a direction of the geomagnetism. The GPS receiver can know a position of the HMD as values of latitude and longitude based on information receivable by a GPS radio wave. The camera captures feature points of the outside world. The position and the direction of the HMD can be estimated from a direction, in which the feature points are located, and map information. The distance measuring sensor measures a distance to a feature point in the outside world. The position and the direction of the HMD can be estimated from the distance and the map information.

In the HMD 1 according to the first embodiment, at least some of the sensors for measuring the states of the HMD as described above are mounted on not the head attached part 1A but the neck attached part 1B. Therefore, the HMD 1 has a function for measuring the relatively positional relationship between the neck attached part 1B and the head attached part 1A. The HMD 1 uses the positional relationship to perform conversion between data measured by the sensor of the neck attached part 1B and data measured by the sensor of the head attached part 1A.

The HMD 1 measures a distance from the distance measuring sensor 7 mounted on the neck attached part 1B to the housing 10 of the head attached part 1A in order to grasp the positional relationship. In particular, the distance measuring sensor 7 measures positions of a plurality of markers 17 in the housing 10 as a plurality of feature points. The plurality of feature points may be three or more points that are not on the same straight line. The neck attached part 1B can obtain a positional relationship between a head coordinate system of the head attached part 1A and a neck coordinate system of the neck attached part 1B based on the measured feature points (FIG. 5 described later).

By using the obtained positional relationship, the HMD 1 can correct and convert the state detected by the sensor of the neck attached part 1B to and into a state with reference to the head coordinate system of the head attached part 1A. Further, by using the obtained positional relationship, the HMD 1 can correct and convert the state detected by the sensor of the head attached part 1A to and into a state with reference to the neck coordinate system of the neck attached part 1B. Therefore, the HMD 1 can grasp both the states of the head's position and direction etc. with reference to the head coordinate system and the states of the body trunk's position and direction etc. with reference to the neck coordinate system. The HMD 1 can perform both display control of a virtual object according to the head's direction and the like and display control of a virtual object according to the body trunk's direction and the like by using data on those states.

[HMD]

Figure 2:
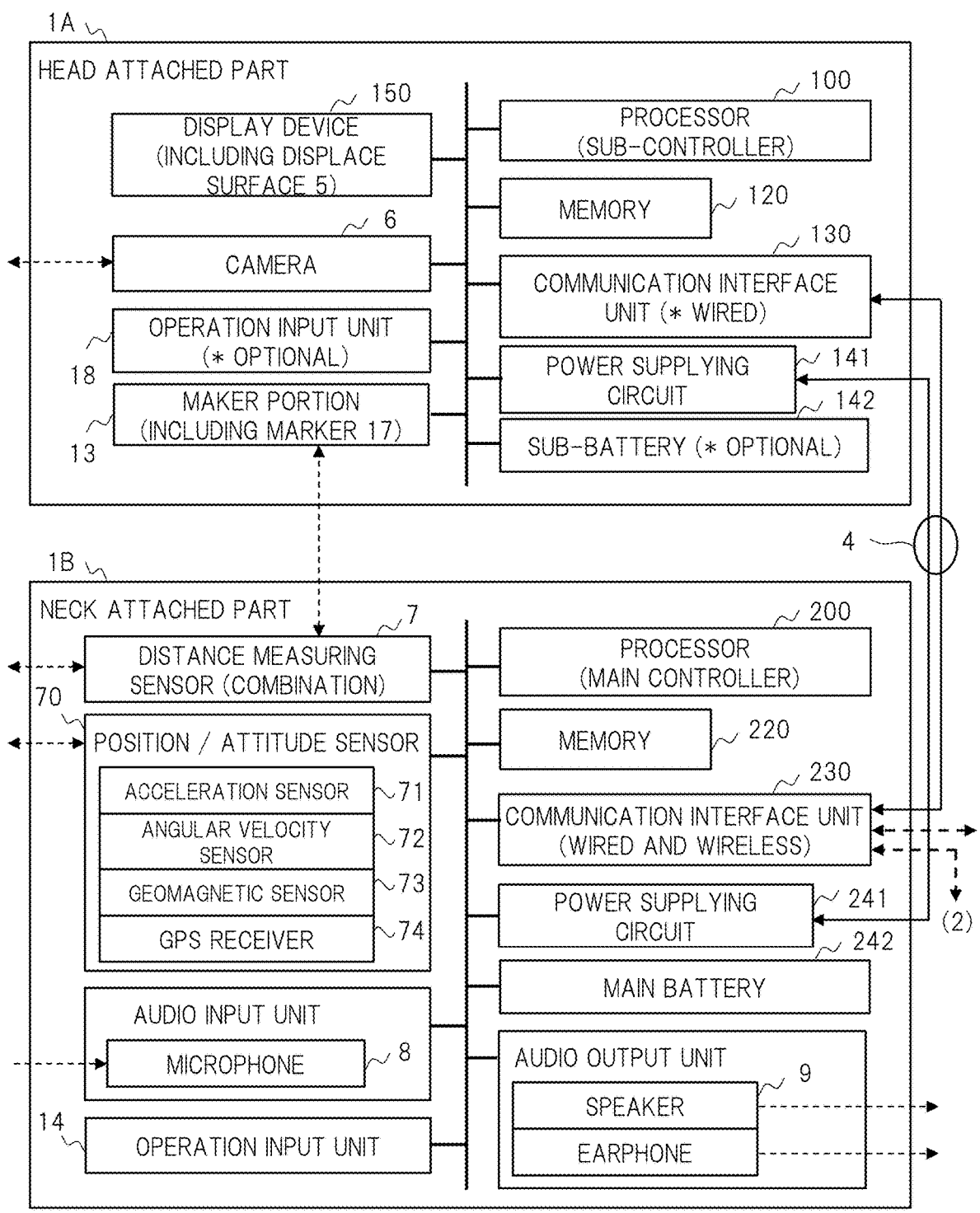
FIG. 2 is a view showing a configuration of the HMD according to the first embodiment.

FIG. 2 shows a functional block configuration of the HMD 1 according to the first embodiment. The head attached part 1A includes a processor 100, a memory 120, a communication interface unit 130, a power supply circuit 141, a sub-battery 142, a display device 150, a camera 6, an operation input unit 18, and the like, and they are connected to one another via a bus or the like.

The processor 100 is a sub-controller that controls the head attached part 1A. Data and information handled by the processor 100 and the like are stored in the memory 120. The communication interface unit 130 is a portion such as a communication circuit that performs wired communication with the neck attached part 1B via the connecting line 4. The power supply circuit 141 is a portion that receives power feeding from the neck attached part 1B via the connecting line 4, and charges the sub-battery 142. The sub-battery 142 supplies electric power to each portion in the head attached part 1A. The mounting of the sub-battery 142 may be omitted. In that case, power feeding is supplied from the power supply circuit 141 to each portion. The display device 150 displays a video image or an image of a virtual object or the like on a region of a display surface 5 based on display data. The camera 6 captures an image of circumference including a front of the head attached part 1A. The operation input unit 18 includes, for example, an operation button or the like for operating the HMD 1. The mounting of the operation input unit 18 can be omitted. The marker portion 13 includes a plurality of markers 17, and may include a circuit or the like that controls light emission of the markers 17.

The neck attached part 1B includes a processor 200, a memory 220, a communication interface unit 230, a power supply circuit 241, a main battery 242, an operation input unit 14, a distance measuring sensor 7, a position/attitude sensor 70, a voice input unit, a voice output unit, and the like, and they are connected to one another via a bus or the like.

The processor 200 is a main controller that controls the entire HMD 1 including the neck attached part 1B. Data and information handled by the processor 200 and the like are stored in the memory 220. The communication interface unit 230 is a portion such as a communication circuit that performs wired communication with the head attached part 1A via the connecting line 4. In addition, the communication interface unit 230 also performs wireless communication with an outside and short-range wireless communication with the operating tool 2. The power supply circuit 241 is a portion that charges the main battery 242 from an external power source and also supplies power feeding to the neck attached part 1B through the connecting line 4. The main battery 242 supplies electric power to each portion in the neck attached part 1B. The operation input unit 14 includes, for example, an operation button or the like for operating the HMD 1. The distance measuring sensor 7 is a combined type described later, and performs both distance measurement of the marker 17 and normal distance measurement. The position/attitude sensor 70 includes an acceleration sensor 71, an angular velocity sensor 72, a geomagnetic sensor 73, and a GPS receiver 74. The audio input unit includes the right and left microphones 8. The audio output unit includes the right and left speakers 9 and earphones.

The memory 220 also stores a control program for configuring the functions of the HMD 1, an application program for realizing each application, setting information, and the like. The setting information includes system setting information and user setting information. The control program or application program is, for example, a program that displays a virtual object (corresponding display object) including a graphical user interface (GUI) for work support in a user's field of view.

In the first embodiment, the neck attached part 1B has been described as a portion that is attached near the neck and shoulders of the user's body trunk, but the present embodiment is not limited to this. The neck attached part 1B may have such a configuration as to be able to detect a state such as a direction of the user's body trunk, so that it can be a body trunk attached part as a portion to be attached to any portion of the body trunk. That is, the body trunk attached part may be a portion to be attached to a chest, a back, a stomach, a waist, or the like.

The reason why the vicinity of the neck is selected as an attached location in the first embodiment also has the following points besides a point convenient to use of a speaker and a microphone. That is, there are points in which a distance between the head attached part and the body trunk attached part is shortened as much as possible and a length of a cable (corresponding connecting line 4) in connecting them by wire is shortened as much as possible. As the cable is shorter, a feeling of the cable clinging to the body can be made less and a user's wearing feeling, ease of movement, and usability can be made better. As a modification example, connection between the head attached part 1A and the neck attached part 1B regarding the communication and power feeding is not limited to wired connection, and may be wireless.

[HMD—Processing Unit]

Figure 3:
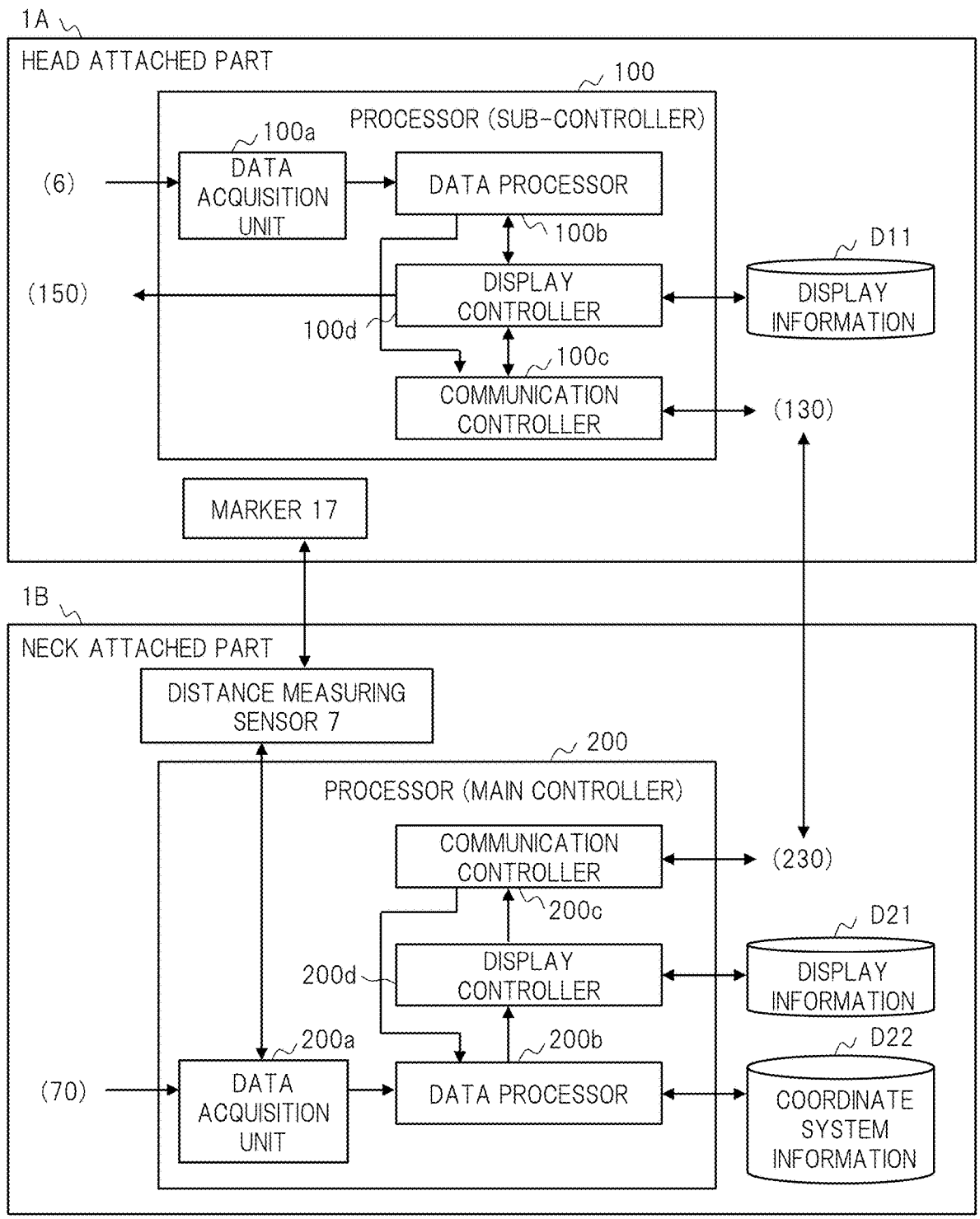
FIG. 3 is a view showing a configuration of a controller and the like in the HMD according to the first embodiment.

FIG. 3 shows a functional block configuration of a control unit and the like realized by a processor 100 of the head attached part 1A and a processor 200 of the neck attached part 1B.

The head attached part 1A includes a data acquisition unit 100a, a data processor 100b, a communication controller 100c, and a display controller 100d as respective processing units in the control unit realized by the processor 100 or the like. The head attached part 1A stores display information D11 and the like in a storage unit realized by a memory 120 and the like. The display information D11 is display data or the like received from the neck attached part 1B.

The neck attached part 1B includes a data acquisition unit 200a, a data processor 200b, a communication controller 200c, and a display controller 200d as respective processing units in the control unit realized by the processor 200 or the like. The neck attached part 1B stores display information D21, coordinate system information D22, and the like in a storage unit realized by the memory 220 and the like. The display information D21 corresponds to display data including an image for display control and control information, and includes data to be transmitted to the head attached part 1A. The coordinate system information D22 corresponds to information for managing and controlling each coordinate system of a head coordinate system and a neck coordinate system, which will be described later, and their positional relationship.

The data acquisition unit 100a of the head attached part 1A acquires data such as an image taken by the camera 6 and stores it in the storage unit. Incidentally, when the head attached part 1A is provided with another sensor, the data acquisition unit 100a acquires data detected by the sensor and stores it in the storage unit. The data processor 100b processes the data acquired by the data acquisition unit 100a as necessary and sends it to the communication controller 100c. The communication controller 100c controls transmission of the data to the neck attached part 1B via a communication interface unit 130.

The data acquisition unit 200a of the neck attached part 1B acquires data detected by each sensor of the position/attitude sensor 70 and data detected by normal distance measurement of the distance measuring sensor 7, and stores them in the storage unit. The communication controller 200c receives, via the communication interface unit 230, the data from the communication controller 100c of the head attached part 1A and sends it to the data processor 200b. Further, the processor 200 uses the distance measuring sensor 7 to cause it to measure a distance of the marker 17 of the head attached part 1A. The data acquisition unit 200a also acquires its distance measurement data. The data processor 200b processes each piece of data acquired by the data acquisition unit 200a and each piece of data from the head attached part 1A as necessary.

The data processor 200b calculates a relatively positional relationship with the head attached part 1A with respect to the neck attached part 1B based on the distance measurement data of the marker 17. This positional relationship corresponds to a positional relationship and a rotational relationship of the origin between the neck coordinate system and the head coordinate system. The data processor 200b stores the calculated data on the positional relationship in the coordinate system information D22.

The data processor 200b calculates states such as a position and a direction of the neck coordinate system and states such as a position and a direction of the head coordinate system by using the positional relationship. At that time, the data processor 200b corrects and converts data detected by the position/attitude sensor 70 of the neck attached part 1B to and into data representing the states in the head coordinate system based on the positional relationship. At that time, the data processor 200b performs the correction and conversion based on calculation of rotation of the coordinate system described later. The data processor 200b stores, in the coordinate system information D22, data such as the states obtained by the calculation.

The display controller 200d refers to data such as the states obtained by the data processor 200b, and controls display of a virtual object onto the display surface 5. The display controller 200d makes, for example, display data for displaying an image at a position aligned with the head direction and display data for displaying an image at a position aligned with the body trunk direction, and stores them in the display information D22. Further, the display controller 200d may perform display control that uses image data or the like of the camera 6 of the head attached part 1A.

The communication controller 200c controls transmission of the display data of the display information D21 to the head attached part 1A via the communication interface unit 230. The communication controller 100c of the head attached part 1A receives the display data and stores it in the display information D11. The display controller 100d controls a display device 150 according to the display data, and causes the display surface 5 to display an image thereof.

Incidentally, in the first embodiment, since the display controller 100d is configured to display the image on the display surface 5, as it is, according to the display data from the display controller 200d, the mounting of the display controller 100d can be omitted or simplified. In another embodiment, the display controller 100d may perform unique display control on the head attached part 1A independently of the display control by the display controller 200d. For example, the display controller 100d may perform display control that uses an image(s) of the camera 6. Further, when the head attached part 1A has a line-of-sight detecting function, the display controller 100d may control image display according to a line-of-sight direction detected by using the function. Further, if the head attached part 1A is configured not to have the camera 6 or other sensors, the mounting of the data processor 100b can be omitted or simplified. A configuration as to perform a main processing(s) by a main controller of the neck attached part 1B makes it possible to reduce the mounting of the devices on the head attached part 1A.

Further, in the first embodiment, the data processor 200b of the neck attached part 1B performs calculation such as conversion of the state that uses the positional relationship, but in another embodiment, the same calculation may be performed by the data processor 100b of the head attached part 1A after transmitting the data on the positional relationship from neck attached part 1B to the head attached part 1A.

[HMD—Processing Flow]

Figure 4:
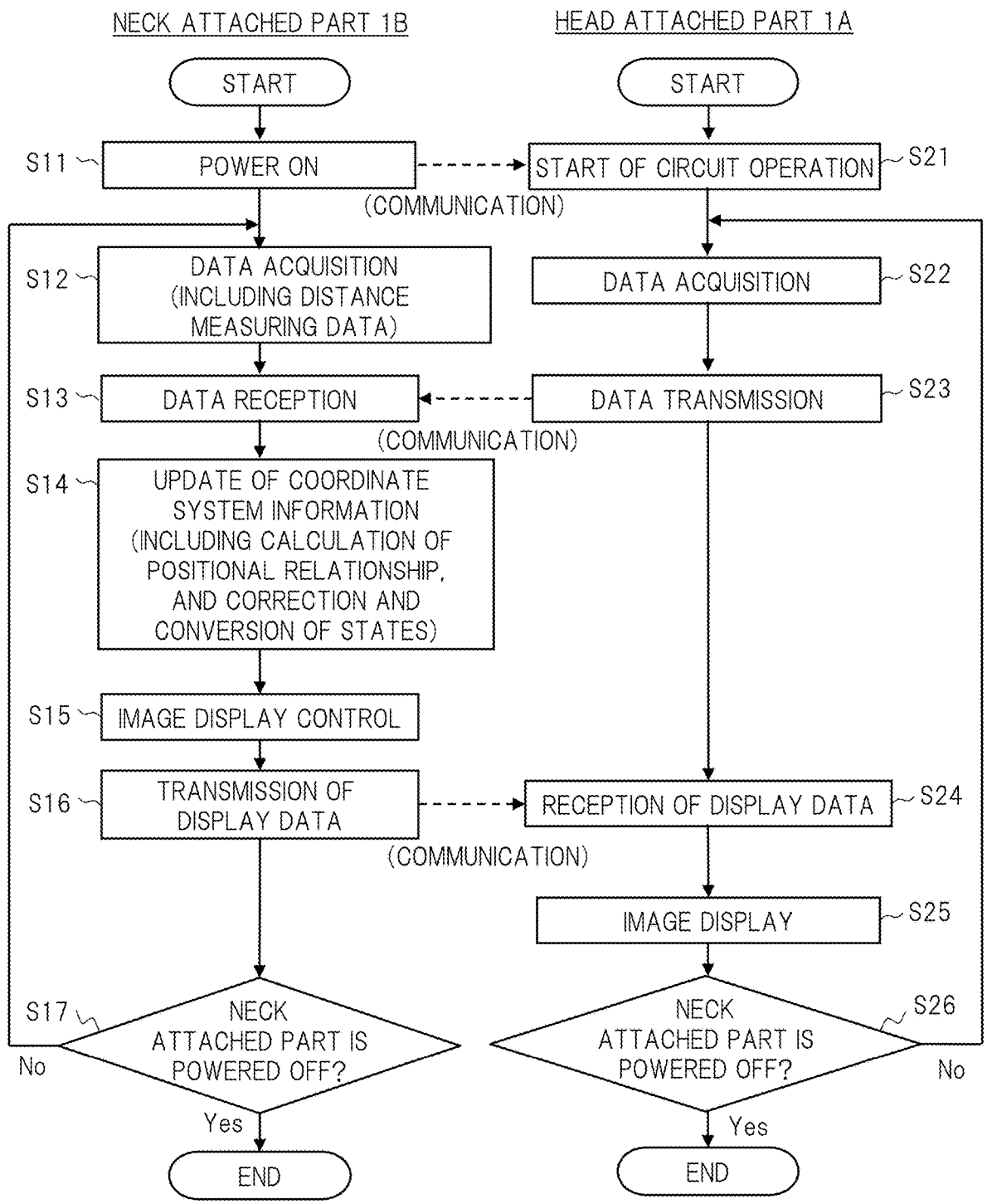
FIG. 4 is a view showing a main processing flow in the HMD according to the first embodiment.

FIG. 4 shows a main processing flow in the HMD 1 according to the first embodiment. FIG. 4 has steps S11 to S17 by the neck attached part 1B and steps S21 to S26 by the head attached part 1A. In step S11, when power is turned on based on a user's operation, the neck attached part 1B performs a start-up processing to start a circuit operation and communicates with the head attached part 1A. In step S21, the head attached part 1A starts a circuit operation in response to communication from the neck attached part 1B.

In step S12, the neck attached part 1B acquires each piece of data by the data acquisition unit 200a. The acquired data at this time includes detected data by the position/attitude sensor 70 and distance measurement data on the distance measurement of the marker 17 by the distance measuring sensor 7. In step S22, the head attached part 1A acquires data by the data acquisition unit 100a. In step S23, the head attached part 1A transmits the data to the neck attached part 1B by the communication controller 100c. In step S13, the neck attached part 1B receives the data by the communication controller 200c.

In step S14, the data processor 200b calculates a positional relationship with the head attached part 1A by using the acquired data, and performs correction and conversion about the states detected by the position/attitude sensor 70 by using the positional relationship. Consequently, the data processor 200b obtains both data representing the states in the neck coordinate system and data representing the states in the head coordinate system, and updates the coordinate system information D22.

In step S15, the display controller 200d makes display data for display control of a virtual object based on the coordinate system information D22, and stores it in the display information D21. In step S16, the communication controller 200c transmits the display data to the head attached part 1A. In step S24, the communication controller 100c of the head attached part 1A receives the display data. In step S25, the display controller 100d displays an image(s) on the display surface 5 based on the display data.

In step S17, when the power is turned off (Yes) based on the user's operation, the neck attached part 1B performs an ending processing of the neck attached part 1B and this flow is ended. At a time of the ending processing, communication to the head attached part 1A is also performed. If the power remains on (No), this processing returns to step S12 and the same processing is repeated. Further, in step S26, when power of the neck attached part 1B is turned off (Yes), the head attached part 1A performs an ending processing of the head attached part 1A and this flow ends. If the power remains on (No), this processing returns to step S22 and the same processing is repeated.

[Coordinate System and Positional Relationship]

FIG. 5 shows a configuration related to each coordinate system and a positional relationship in the HMD 1 according to the first embodiment. Incidentally, FIG. 5 omits illustrations of the connecting line 4, the user's body, and the like. (A) shows a first example of a state of the HMD1, and (B) shows a second example of the state. In the state of (A), a direction of the body trunk such as the user's neck and a direction of the head are almost the same, and this state is forward. Correspondingly thereto, a direction (axis $X_N$) of the neck attached part 1B and a direction (axis $X_H$) of the head attached part 1A are almost the same. It is assumed that a coordinate system of the head attached part 1A is a head coordinate system CH {axis $X_H$, $Y_H$, $Z_H$}, and an origin is the origin $O_H$. It is assumed that a coordinate system of the neck attached part 1B is a neck coordinate system CN {axis $X_N$, $Y_N$, $Z_N$}, and an origin is the origin $O_N$. A position of the origin $O_N$ is defined based on a relatively positional relationship from each portion (particularly, a position of the distance measuring sensor 7) of the neck attached part 1B. In this state, axes $X_H$ and $X_N$ correspond to a forward direction; axes $Y_H$ and $Y_N$ correspond to a left direction; and axes $Z_H$ and $Z_N$ correspond to an upward direction. The neck coordinate system CN is, in other words, a body trunk coordinate system.

A vector V1 is a vector representing a relatively positional relationship with the head attached part 1A with respect to the neck attached part 1B, and is a vector from the origin $O_N$ to the origin $O_H$. Incidentally, when an opposite vector to the vector V1 is considered, the vector is a vector representing a relatively positional relationship with the neck attached part 1B with respect to the head attached part 1A.

The state of (B) is an example in which the user changes the direction and position of the head from the state of (A) without nearly changing the body trunk. In the state of (B), the state of the neck attached part 1B is almost unchanged from the state of (A). In the state of (B), the position of the head attached part 1A has moved slightly forward with respect to the state of (A), and the direction of the head attached part 1A has rotated slightly on a left side.

The HMD 1 distance-measures a plurality of markers 17 of the head attached part 1A from the distance measuring sensor 7 of the neck attached part 1B. The vector v1 is a vector from the position of the distance measuring sensor 7 to the position of the marker 17 at the time of the distance measurement. The HMD 1 calculates a relatively positional relationship between the neck attached part 1B and the head attached part 1A based on distance measurement data. This positional relationship is represented by the vector V1 between the origins and by the rotation between the head coordinate system CH and the neck coordinate system CN.

Measured points (corresponding markers 17) that require the distance measurement to calculate the positional relationship are at least three points that are not on the same straight line. An illustrated example is configured so that a total of four points are distance-measured on the left and right sides by using the two distance measuring sensors 7 on the left and right sides, but the present embodiment is not limited to this. As a result, if the three points can be distance-measured, the relational relationship is calculable. In the illustrated example, the positions of the markers 17 are one location of a front end on each side surface of the housing 10 and one location in each middle thereof, but the present embodiment is not limited to this. Furthermore, in this configuration example, each of the two right and left distance measuring sensors 7 distance-measures two points on the left and right sides of the housing 10. The present embodiment is not limited to this, and the left and right markers 17 of the housing 10 may be distance-measured from one distance measuring sensor 7.

Further, in FIG. 5, the distance measuring sensor 7 is a combined type, and can perform two types of distance measurement, that is, distance measurement 501 for calculating the positional relationship and normal distance measurement 502. The distance measurement 501 is distance measurement of such a marker 17 as to include the vector v1. The normal distance measurement 502 is distance measurement to a surrounding object including a front direction of the HMD 1. The normal distance measurement 502 is, for example, distance measurement for grasping a structure of a surrounding room. The present embodiment is not limited to this. In a modification example of the HMD, a distance measuring sensor for the distance measurement 501 for calculating the positional relationship and the distance measuring sensor for the normal distance measurement 502 may be provided separately. For example, the distance measuring sensor for the normal distance measurement 502 may be provided at a position on a front side of the housing 11, and the distance measuring sensor for the distance measurement 501 may be provided at a position on a middle or a back side of the housing 11 or at the housing 12. Furthermore, these two types of distance measuring sensors may be separately mounted on the head attached part 1A and the neck attached part 1B.

[Distance Measuring Sensor]

A TOF sensor (TOF: Time of Flight), a stereo system camera, or the like can be applied to the distance measuring sensor 7. The TOF sensor detects light returning after irradiated reference light has hit an object, and calculates a distance from a flight time of the light. In applying the TOF sensor, a reflective member that efficiently reflects light having a wavelength of the reference light may be arranged, as the marker 17, on the head attached part 1A. The wavelength of the reference light is, for example, a wavelength in a near infrared region. Consequently, an intensity of the reflected light of the TOF sensor is increased, a measurement error can be reduced, and the feature points can be easily detected. Furthermore, in using the reference light in the near infrared region, the present embodiment also has such an effect that an influence of ambient light outdoors becomes stronger.

The stereo system camera calculates a distance from a difference between the feature points in the captured left and right images. In applying the stereo system camera, a light emitting marker may be arranged as the marker 17 of the head attached part 1A. The marker portion 13 may control light emission of the marker 17. This light emitting marker emits near-infrared light, for example. Consequently, incident light in the stereo system camera is increased, the measurement error can be reduced, the feature points can be easily detected, and the same effect as that of the TOF camera can be obtained.

Further, in measuring the distance from the distance measuring sensor 7 of the neck part 1B to the marker 17 of the head attached part 1A, it may be difficult to measure the distance due to some influence. In that case, the HMD 1 measures an arbitrary feature point in the outside world other than the marker 17 by both the distance measuring sensor 7 on a neck attached part 1B side and the camera 6 or another sensor on a head attached part 1A side, may estimate a positional relationship based on measured data of both of them. As a modification example, both the neck attached part 1B and the head attached part 1A may be provided with the distance measuring sensor 7 and, in that case, the positional relationship can be estimated by using distance-measured data by two upper and lower distance measuring sensors 7.

By using the distance measuring sensors 7 in combination, the number and weight of devices to be mounted can be reduced. When the distance measuring sensor 7 is separated for normal distance measurement and for positional-relationship distance measurement, the number and weight of devices to be mounted increase, but the present embodiment has such an advantage that the optimum distance measuring sensor can be selected according to the measurement distance.

[Positional Relationship Calculation and Display Control]

Figure 6:
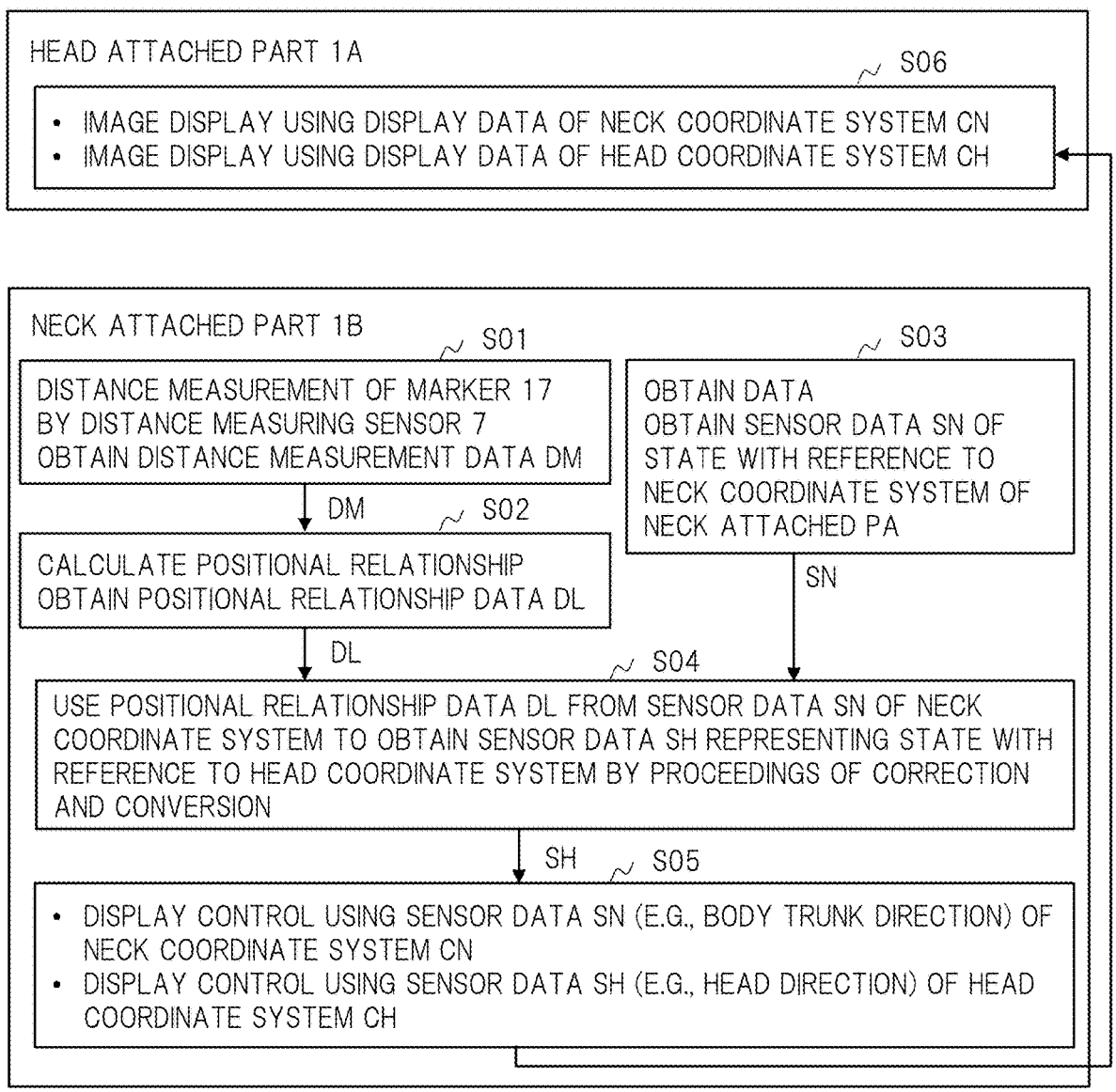
FIG. 6 is a view showing calculation and the like of the positional relationship in the HMD according to the first embodiment.

FIG. 6 shows a processing example for the above-mentioned positional relationship calculation and the like. In step S01, the neck attached part 1B obtains distance measurement data DM on the distance measurement of the marker 17 by the distance measuring sensor 7. In step S02, the neck attached part 1B calculates the positional relationship with the head attached part 1A by using the distance measurement data DM, and obtains positional relationship data DL. In step S03, the neck attached part 1B obtains data such as sensor data SN on states such as a position and a direction with reference to the neck coordinate system CN by the position/attitude sensor 70. In step S04, the neck attached part 1B uses the positional relationship data DL from the sensor data SN of the neck coordinate system CN and obtains, by correction and conversion processings based on the rotation of the coordinate system, data such as sensor data SH representing states such as a position and a direction with reference to the head coordinate system CH.

In step S05, the neck attached part 1B performs a display control processing using the sensor data SN of the neck coordinate system CN and a display control processing using the sensor data SH of the head coordinate system CH. For example, the neck attached part 1B makes display data for displaying a virtual object aligned with the head direction and display data for displaying a virtual object aligned with the body trunk direction, and transmits them to the head attached part 1A.

In step S06, the head attached part 1A displays each image on the display surface 5 based on the display data from the neck attached part 1B. That is, the head attached part 1A displays an image at a position aligned with the body trunk direction according to the display data with reference to the neck coordinate system CN, and also displays an image at a position aligned with the head direction according to the display data with reference to the head coordinate system CH.

[Neck Attached Part]

Figure 7:
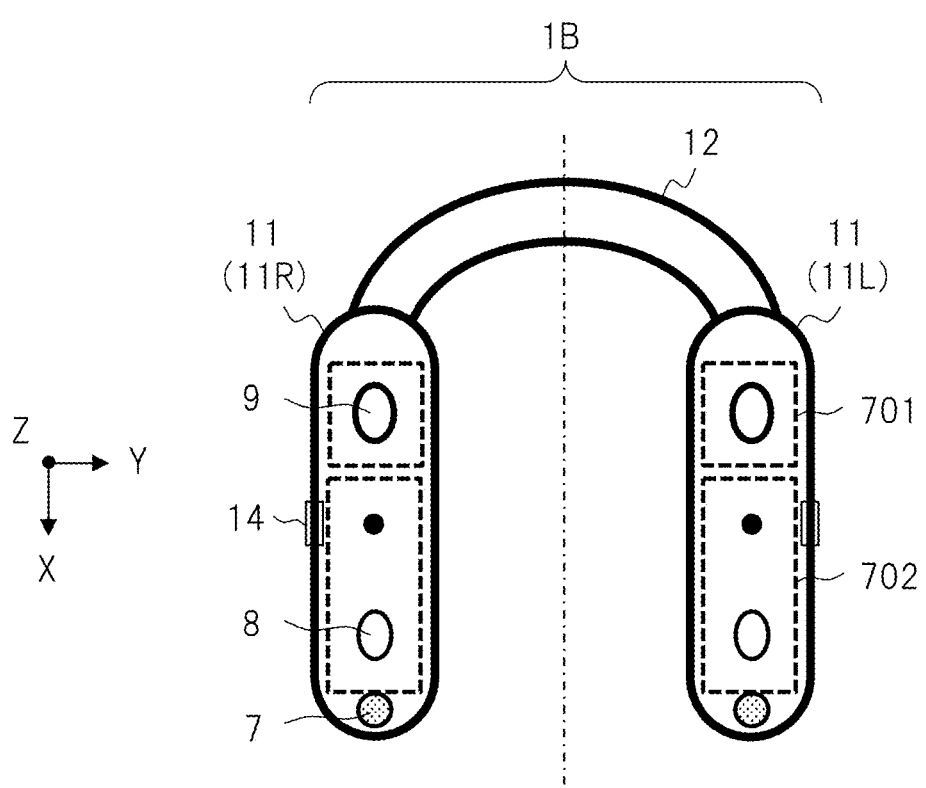
FIG. 7 is a view showing a mounting example of elements in a neck attached part in the HMD according to the first embodiment.

FIG. 7 shows a mounting example of components in the neck attached part 1B. The neck attached part 1B has a control circuit 701 and a battery 702 mounted symmetrically inside each of left and right housings 11 (11L, 11R) in the Y direction. In the housing 11, the battery 702 is arranged on a front side in the X direction, and the control circuit 701 is arranged on a back side. The control circuit 701 corresponds to a portion such as an IC board on which each of components such as the processor 200, the memory 220, and the communication interface unit 230 of FIG. 2 is mounted. The battery 702 corresponds to a portion on which the main battery 242 is mounted.

A certain component(s) is disposed at least at one location of the right and left housings 11 or the housing 12 on its back side. Alternatively, a certain component may be divided into the left and right housings 11 and arranged as a plurality of portions. Further, a certain component may be divided into the right and left housings 11 and duplicated. For example, the processor 200 is arranged in one of the right and left control circuits 701, and another component is arranged in the other of the control circuits 701. For example, the main battery 242 is separately arranged and duplicated as two portions of the right and left batteries 702. One battery 702 may be actually used, and the other battery 702 may be used for charging. The right and left batteries 702 may be configured to be interchangeable. In this case, the user can replace the other battery 702 while using one battery 702 without turning off the power. Furthermore, for example, the distance measuring sensor 7 is separately arranged as two distance measuring sensors in the right and left housings 11. The distance measuring sensor 7 and other sensors may be duplicated so that only one of right and left sensors can function.

Like this example, a right and left weight balance of the entire HMD 1 is taken by making its configuration symmetrical as much as possible with respect to the mounting of each component. That is, weight of the right-side housing 11R and weight of the left-side housing 11L are set to almost the same. In addition, the weight balance is taken in a front-back direction including the housing 12. Consequently, a wearing feeling of the HMD 1 by the user is made better. In a case of a redundant configuration of duplicating a certain component like the right and left housings 11, an effect such as improvement of availability can be obtained. Incidentally, without being limited to arrangement shown in FIG. 7, for example, the control circuit 701 may be arranged on the front side and the battery 702 may be arranged on the back side in the X direction. Other components such as the microphone 8 and the speaker 9 are also arranged in each of the right and left housings 11 so as to balance the weight on the right and left sides.

The power consumption of the HMD tends to increase as the function becomes more sophisticated. Battery capacity and weight required in mounting the battery also tend to increase according to the increase in the power consumption. Therefore, in the example of the first embodiment, a reduction in the weight of the head attached part 1A is achieved by mounting the main battery 242 on the neck attached part 1B. At the same time, the right and left weight balance of the neck attached part 1B is taken by symmetrically arranging parts having the same weight as the two batteries 702 in the right and left housings 11 of the neck attached part 1B. The right and left weight balance may be achieved by arranging the same components on the right and left sides, or may be established between a certain component (for example, the processor 200) and another component. Consequently, the weight balance of the entire HMD 1 can be easily taken, and a cause of positional displacement of the neck attached part 1B during the mounting is also reduced.

[Connecting Line]

FIG. 8 shows a configuration example about attachment or the like of the connecting line 4 in the HMD 1. (A) is a first configuration example, which is a configuration example in consideration of ease of the mounting. The HMD 1 has respective left and right connecting lines 4 (4L, 4R). One end of the connecting line 4 is connected to a terminal near each center of right and left parts of the housing 10 of the head attached part 1A and at each position in front of user's ears at a time of being attached to the user. The other end of the connecting line 4 is connected to a terminal located near each central position of the right and left housings 11 of the neck attached part 1B. Each connecting line 4 passes in front of the user's ear and becomes hanging down therefrom. An interval 801 is a distance between attachment positions of the left and right connecting lines 4 (4L, 4R) of the housing 10 of the head attached part 1A in the Y direction. An interval 802 is a distance between attachment positions of the left and right connecting lines 4 of the housing 11 of the neck attached part 1B in the Y direction. In the HMD 1, a positional displacement of the display surface 5 with respect to the head affects display performance. Therefore, in this way, the present embodiment is configured to symmetrically connect the head attached part 1A and the neck attached part 1B by the two connecting lines 2. Consequently, the right and left weight balances are taken and the cause of the positional displacement is reduced, which is preferable.

When the user wears (attaches) the HMD 1, the neck attached part 1B is hung on his or her neck/shoulder and the head attached part 1A is hung right in front of the head. When the user does not use the image display by the head attached part 1A at a time of rest or the like, the user can also remove the head attached part 1A from the head and become lowering it in front of his or her chest. Incidentally, in this configuration example, connection or non-connection of the connecting line 4 to the terminal of the housing by the user is possible, but the connecting line 4 may be fixedly connected to the housing.

(B) is a second configuration example. One end of each of the left and right connecting lines 4 (4L, 4R) is connected at each position of back ends of left and right parts of the housing 10 of the head attached part 1A and at each position behind the user's ears at the time of being attached to the user. The other end of the connecting line 4 is connected at a position closer to each back side of the left and right housings 11 of the neck attached part 1B. Each connecting line 4 passes behind the user's ear and becomes hangs down therefrom. Each of an interval 803 and an interval 804 also indicates a distance between attachment positions of the connecting wires 4 similarly to (A).

An aspect of the connecting line 4 is not limited to the example of FIG. 8, and may be another aspect. In another aspect, the other end of the connecting line 4 may be connected to the housing 12 behind the neck attached part 1B, or may be combined as one connecting line 4 without being divided into left and right connecting lines.

Regarding the interval between the connecting lines 4, the first configuration example of (A) shows a case where the interval 801 and the interval 802 are substantially the same. The second configuration example of (B) shows a case where the interval 804 is slightly wider than the interval 803.

Various aspects are possible about the configurations of the housing of the HMD 1, the interval between the connecting lines 4, and the like. The interval 801 on the head side and the interval 802 on the neck side may be the same. The interval 802 on the neck side may be made larger than the interval 801 on the head side. The interval 802 on the neck side may be made smaller than the interval 801 on the head side. Further, the above-mentioned interval is fixedly designed in advance, but as another form, for example, the user may be able to adjust the above-mentioned interval by configuring the housing so as to be soft and flexible or deformable. For example, in the neck attached part 1B, the left and right housings 11 may be configured by rigid members, and the back housing 12 may be configured by bending members. The user can adjust the interval 802 of the neck attached part 1B according to a physical size, clothes, a wearing feeling, and the like. Furthermore, in adjusting the interval 802, the HMD 1 may measure the interval 802 at that time by using, for example, the distance measuring sensor 7 or another sensor. The intervals 801, 802 and a positional relationship between components such as various sensors arranged in the housing of the HMD1 are preset as setting values in order to realize the functions of the HMD 1. When the interval 802 or the like is changed, the above-mentioned setting value is also updated.

A shape of the neck attached part 1B is not limited to an arc shape, and may have another shape. It may be, for example, such a shape that a front neck of the housing 11 is closed. Each of the left and right housings 11 has a rod shape, but is not limited to this, and may have a shape close to flat like a shoulder pad. The neck attached part 1B may have a clothing shape like, for example, a vest or work clothing.

FIG. 9 shows a configuration example of a distance between the left and right parts of the housing of the HMD 1 in the Y direction in relation to FIG. 8. FIG. 9 schematically shows a front face of a state where the user has attached the head attached 1A and the neck attached part 1B. A width W1 indicates a width between the left and right parts of the housing 10 of the head attached part 1A in the Y direction. A width W2 indicates a width between the left and right parts of the housing 11 of the neck attached part 1B in the Y direction. (A) shows a case where the width W1 and the width W2 are almost the same. (B) shows a case where the width W2 is larger than the width W1 (W1<W2).

The HMD 1 desirably has a configuration in which the positions of the distance measuring sensor 7 and the marker 17, etc. and dimension of the width etc. of each part are designed so that the distance measurement from the distance measuring sensor 7 of the neck attached part 1B to the marker 17 of the head attached part 1A is easily performed. In a case of (A), the marker 17 is measured upward from the distance measuring sensor 7. In a case of (B), the marker 17 is measured in a slightly oblique direction above the distance measuring sensor 7. In the first embodiment, the width W2 on the neck side is set to the width W1 or more on the head side in consideration of ease of the mounting, a reduction in factors of the positional displacement, ease of the distance measurement, and the like (W1≤W2). The present embodiment is not limited to this, and can also adopt another setting. In other forms, the width W2 on the neck side may be smaller (W1>W2).

Incidentally, the marker 17 may be arranged on a downward surface of the housing 10, or may be arranged on a lateral surface. The distance measuring sensor 7 may be arranged on an upward surface of the housing 11, or may be arranged on a lateral surface. As a modification example, in (A), a portion such as a distance measuring sensor 7 or another sensor may be arranged at each position 901 which extends to the left and right outside from the housing 11 of the neck attached part 1B and is separate from the housing. Further, the modification example may have such a form that a length of the extension can be adjusted by the user.

[Separation Configuration Example]

FIG. 10 shows a table that summarizes some configuration examples in which the components are divided into upper and lower portions of the head attached part 1A and the neck attached part 1B and are mounted in the HMD 1 of the first embodiment and each modification example.

First, the configuration in the first embodiment is shown in FIG. 2 and the like described above, but the neck attached part 1B is provided with a distance measuring sensor 7, a position/attitude sensor 70, a main battery 242, a microphone 8, a speaker 9, and the like. The head attached part 1A is provided with a camera 6, a display device 150, a sub-battery 142, and the like. The position/attitude sensor 70 includes the above-mentioned acceleration sensor 71, angular velocity sensor 72, geomagnetic sensor 73, and GPS receiver 74, and the distance measuring sensor 7 and the camera 6 are considered separately. Since the neck attached part 1B is fixed to the user's body trunk, the position/attitude sensor 70 detects a state of a direction or the like of the user's body trunk. In normal distance measurement, the distance measuring sensor 7 measures a distance to an object around the neck attached part 1B (FIG. 5). In photographing the outside world with the camera 6, it is advantageous that the outside world close to the user's viewpoint is more easily photographed. Therefore, in the first embodiment, the camera 6 is provided on the head attached part 1A located at a position higher than that of the neck attached part 1B.

Next, a first modification example of the first embodiment has a configuration different from that of the first embodiment in that the camera 6 is provided to the neck attached part 1B. This makes it possible to further reduce the weight of the head attached part 1A. Incidentally, in the first modification example, the image of the camera 6 is an image with reference to the neck coordinate system CN. Therefore, when it is desired to obtain image information with reference to the head coordinate system CH, the image of the camera 6 may be corrected and converted by using the above-mentioned positional relationship. The first modification example emphasizes weight reduction of the head attached part 1A, and many components are mounted on the neck attached part 1B.

Next, a second modification example has a configuration different from that of the first embodiment in that the distance measuring sensor for normal distance measurement is provided, as a second distance measuring sensor, to the head attached part 1A separately from the distance measuring sensor 7 of the neck attached part 1B. Since more easily seeing the outside world is advantageous in distance-measuring an object(s) in the outside world, the second modification example provides the second distance measuring sensor to the head attached part 1A which is arranged at a higher position.

Next, a third modification example has a configuration different from that of the first embodiment in that one partial sensor of the position/attitude sensor 70 is provided in the head attached part 1A and the other partial sensor thereof is provided in the neck attached part 1A. In particular, the acceleration sensor 71 and the angular velocity sensor 72 are mounted on the head attached part 1A, and the geomagnetic sensor 73 and the GPS receiver 74 are mounted on the neck attached part 1B. Since accuracy of detecting a rotational direction and a gravity direction of the head is particularly important, it is an advantage that the sensor is mounted on the head attached part 1A similarly to the third modification example when the advanced function is emphasized.

Next, a fourth modification example is provided with a position/attitude sensor, a type whose overlaps, to both the neck attached part 1B and the head attached part 1A. In particular, a high-performance sensor is mounted as a main sensor on the neck attached part 1B, and a lightweight sensor is mounted as a sub-sensor on the head attached part 1A. For example, the HMD 1 normally acquires high-precision data by using the sensor of the neck attached part 1B, and may acquire sensor data of the head attached part 1A if the sensor data of the neck attached part 1B cannot be acquired for any reason. The fourth modification example has a configuration in which high accuracy and availability are emphasized while the weight of the head attached part 1A is suppressed.

As another modification example, the microphone 8, the speaker 9 and the like may be provided to the head attached part 1A instead of the neck attached part 1B. Of course, a form of combining various configurations as described above can be adopted.

[Coordinate System]

A relationship between the head coordinate system CH of the head attached part 1A and the neck coordinate system CN of the neck attached part 1B in FIG. 5 will be described below. Incidentally, in the following explanation, the coordinate systems are unified to the right-handed system. Rotation of the coordinate system between the head coordinate system CH and the neck coordinate system CN can be expressed by Euler angles or normalized quaternions. In the following, a normalized quaternion is used to represent the rotation of the coordinate system. The processor 200 (particularly, the data processor 200b of FIG. 3) performs calculation including such rotation of the coordinate system.

A normalized quaternion is a quaternion with a norm of 1 and can represent rotation around a certain axis. A normalized quaternion q representing rotation of an angle $\eta$ by using a unit vector $(n_X, n_Y, n_Z)$ as a rotational axis is given by Equation 1 as described below.

$$q = \cos(\eta/2) + n_X \sin(\eta/2)i + n_Y \sin(\eta/2)j + n_Z \sin(\eta/2)k \quad \text{Equation 1:}$$

Here, i, j, and k are units of quaternions. Clockwise (right-hand) rotation in a case of facing a direction of the vector $(n_X, n_Y, n_Z)$ is rotational direction in a case where $\eta$ is positive. Rotation of any coordinate system can be represented by this normalized quaternion.

Usage of symbols will be summarized as follows. The real part of the quaternion q is represented by Sc(q). The conjugate quaternion of the quaternion q is represented by q*. An operator that normalizes the norm of the quaternion q to 1 is defined by [•]. Assuming that q is an arbitrary quaternion, Equation 2 as described below is definition of the operator [•]. The denominator on the right side of Equation 2 is the norm of the quaternion q.

$$[q] = q/(q\,q^*)^{1/2} \quad \text{Equation 2:}$$

Next, a quaternion p representing a coordinate point or a vector $(p_X, p_Y, p_Z)$ is defined by Equation 3 as described below.

$$p = p_X i + p_Y j + p_Z k \quad \text{Equation 3:}$$

In the present specification, unless otherwise specified, it is assumed that symbols representing coordinate points and vectors which are not displayed as components are displayed as quaternions. Further, it is assumed that a symbol representing rotation is a normalized quaternion.

It is assumed that $P_T(n)$ is a projection operator of a vector onto a plane perpendicular to a direction of a unit vector n. A projection of a vector p is expressed by Equation 4 as described below.

$$P_T(n)p = p + n Sc(np) \quad \text{Equation 4:}$$

It is assumed that a coordinate point or a directional vector $p_1$ is converted into a coordinate point or a directional vector $p_2$ by a rotational operation of an origin center represented by the quaternion q. By doing so, the directional vector $p_2$ can be calculated by Equation 5 as described below.

$$p_2 = q p_1 q^* \quad \text{Equation 5:}$$

It is assumed that a normalized quaternion obtained by rotating around an axis perpendicular to a plane including $n_1$ and $n_2$ so that a unit vector $n_1$ is superimposed on a unit vector $n_2$ is R $(n_1, n_2)$. R $(n_1, n_2)$ is given by Equation 6 as described below.

$$R(n_1, n_2) = [1 - n_2 n_1] \quad \text{Equation 6:}$$

Next, a relationship between the head coordinate system CH of the head attached part 1A and the neck coordinate system CN of the neck attached part 1B will be described. When the user moves his/her neck or head, a positional relationship between the two coordinate systems changes. For example, a state of (A) in FIG. 5 changes to a state of (B). In the HMD 1 of the first embodiment, a positional relationship between the two coordinate systems is grasped by constantly measuring the feature points, which are indicated by the markers 17 of the head attached part 1A, from the distance measuring sensor 7 of the neck attached part 1B.

Coordinates of a measurement point (corresponding marker 17) in the head coordinate system CH, in other words, a shape or the like of the housing 10 is known in advance by design. It is assumed that coordinate values of these three points in the head coordinate system CH are $p_{H0}$, $p_{H1}$, and $p_{H2}$. Coordinate values of the three points in the neck coordinate system CN can be obtained by the measurement by the distance measuring sensor 7. It is assumed that coordinate values of these three points are $p_{N0}$, $p_{N1}$, and $p_{N2}$.

The HMD 1 first calculates rotation to align the direction of the coordinate system. It is assumed that three measurement points are a first measurement point, a second measurement point, and a third measurement point. It is assumed that representations of unit vectors in respective directions directed from the first measurement point to the second measurement point and the third measurement point in the head coordinate system CH are defined as $n_{H1}$ and $n_{H2}$. Similarly, it is assumed that representations in the neck coordinate system CN are defined as $n_{N1}$ and $n_{N2}$. Specifically, these are given by Equation 7 as described below. Incidentally, two directional vectors having different directions have only to be obtained, and the number of measurement points is not limited to three.

$$n_{H1} = [p_{H1} - p_{H0}]$$
$$n_{H2} = [p_{H2} - p_{H0}]$$
$$n_{N1} = [p_{N1} - p_{N0}]$$
$$n_{N2} = [p_{N2} - p_{N0}] \quad \text{Equation 7:}$$

First, in the rotation in the representation of the head coordinate system CH, rotation $q_{TA}$, which is rotation for superimposing $n_{N1}$ on $n_{N1}$, will be considered. Here, the rotation $q_{TA}$ is given by Equation 8 as described below.

$$q_{TA} = R(n_{H1}, n_{N1}) \quad \text{Equation 8:}$$

Next, it is assumed that directions of rotating $n_{N1}$ and $n_{H2}$ due to the rotation $q_{TA}$ are defined as $n_{A1}$ and $n_{A2}$. This direction is given by Equation 9 as described below.

$$n_{A1} = q_{TA} n_{H1} q_{TA}^* = n_{N1}$$
$$n_{A2} = q_{TA} n_{H2} q_{TA}^* \quad \text{Equation 9:}$$

These are an angle between the same directions, so that an angle formed by $n_{A1}$ and $n_{A2}$ is equal to an angle formed by $n_{N1}$ and $n_{N2}$. Further, since the three measurement points are not on the same straight line, the angle formed by $n_{N1}$ and $n_{N2}$ is not 0 (zero). Therefore, $n_{A1}$, that is, rotation $q_{TB}$ obtained by using $n_{N1}$ as an axis is uniquely determined, and $n_{A2}$ can be superimposed on $n_{N2}$. Specifically, the rotation $q_{TB}$ is given by Equation 10 as described below.

$$q_{TB} = R([P_T(n_{N1})n_{A2}], [P_T(n_{N1})n_{N2}]) \quad \text{Equation 10:}$$

By this rotation $q_{TB}$, $n_{A1}$ and $n_{A2}$ are rotated to $n_{N1}$ and $n_{N2}$ of Equation 11 as described below.

$$n_{N1} = q_{TB} n_{A1} q_{TB}^*$$
$$n_{N2} = q_{TB} n_{A2} q_{TB}^* \quad \text{Equation 11:}$$

The rotation $q_T$ is defined again by Equation 12 as described below. This rotation $q_T$ is rotation in the head coordinate system CH, which aligns the direction of the neck coordinate system CN with the direction of the head coordinate system CH.

$$q_T = q_{TB} q_{TA} \quad \text{Equation 12:}$$

Finally, a relationship between coordinate origins is obtained. If it is assumed that a coordinate origin of the neck coordinate system CN in the head coordinate system CH is $O_{NH}$, $O_{NH}$ is given by Equation 13 as described below.

$$O_{NH} = p_{H0} - q_T^* p_{N0} q_T \quad \text{Equation 13:}$$

From the above, if positions of three or more feature points (corresponding markers 17), which are not on the same straight line among the feature points of the head attached part 1A, can be measured from the neck attached part 1B, a relationship between the directions of the neck coordinate system CN and the head coordinate system CH, that is, the above-mentioned positional relationship can be obtained. This makes it possible for the HMD 1 to use the head coordinate system CH and the neck coordinate system CN in an integrated manner.

If the relationship between the head coordinate system CH and the neck coordinate system CN calculated as described above is known, mutual conversion from a value of one coordinate system to a value of the other coordinate system can be performed regardless of whether a sensor such as the position/attitude sensor is arranged in the head attached part 1A or the neck attached part 1B. Therefore, various devices including the above-mentioned position/attitude sensor 70, specifically the acceleration sensor 71, angular velocity sensor 72, geomagnetic sensor 73, GPS receiver 74, camera 6, and distance measuring sensor 7 may be basically mounted on either the head attached part 1A or the neck attached part 1B. The HMD 1 of the first embodiment has a configuration in which at least some of the above-mentioned devices are mounted on not the head attached part 1A but the neck attached part 1B. This makes it possible to provide the advanced functions using the above-mentioned devices and reduce the weight of the head attached part 1A.

[Display Information and Coordinate System Information]

FIG. 11 shows a configuration example of display information D21 and coordinate system information D22 in the neck attached part 1B. A DB (database) of the display information D21 includes a display object information table T01. In the display object information table T01, information such as an object ID, a display coordinate system, arrangement coordinates, and an arrangement direction is stored for each display object that is displayed on the display surface 5. The display coordinate system can be selected from each coordinate system. The arrangement coordinates and the arrangement direction are position coordinates and a direction in the display coordinate system.

The DB of the coordinate system information D22 includes a coordinate system information table T02. The coordinate system information table T02 stores information such as an origin position and a front direction for each of the various coordinate systems. The various coordinate systems include a world coordinate system (referred to as CW), a head coordinate system CH, a neck coordinate system CN, an inertial coordinate system (referred to as CI) described later, and the like. Origins of respective coordinate systems are set as an origin G1 of the world coordinate system CW, an origin G2 (=$O_H$) of the head coordinate system CH, an origin G3 (=$O_N$) of the neck coordinate system CN, and an origin G4 of the inertial coordinate system CI, and they have position coordinates with reference to a certain coordinate system. The front direction of each coordinate system is represented, for example, as a direction of a certain axis.

[Effects Etc.]

As described above, the HMD 1 of the first embodiment makes it possible to realize a good balance between advanced functions and weight reduction by a separable type configuration and to improve the usability of the user.

As a modification example, when a configuration of providing the camera 6 on the neck attached part 1B side (modification example 1 in FIG. 10) is adopted, a wide-angle camera may be applied as the camera 6. The wide-angle camera is, for example, a camera capable of taking an image at a field angle of 180 degrees or more. The HMD 1 determines and cuts a part out of a wide-angle image taken by the wide-angle camera, the part of the wide-angle image corresponding to the head direction of the head attached part 1A, and may use the cut image as image display control with reference to the head direction. This configuration is particularly effective in a case of the non-transparent display surface 5. Further, the wide-angle camera may be used in combination for normally photographing the outside world and for measuring the positional relationship.

Second Embodiment

An HMD according to a second embodiment of the present invention will be described with reference to FIG. 12. Hereinafter, components different from those of the first embodiment in a second embodiment and the like will be described. In an HMD 1 according to a second embodiment, the distance measuring sensor 7 is provided to the head attached part 1A, and a plurality of markers 17 are provided on the neck attached part 1B. That is, the distance measurement of the positional relationship between the neck attached part 1B and the head attached part 1A in the second embodiment has an opposite relationship to the first embodiment. The HMD 1 distance-measures, as feature points, the plurality of markers 17 of the neck attached part 1B from the distance measuring sensor 7 of the head attached part 1A, and calculates the positional relationship of the neck attached part 1B with respect to the head attached part 1A based on the distance measurement data. The HMD 1 uses the positional relationship to perform correction and conversion between the data of the state detected by the sensor of the head attached part 1A and the data of the state detected by the sensor of the neck attached part 1B. This calculation can be realized in the same manner as that in the first embodiment.

Figure 12:
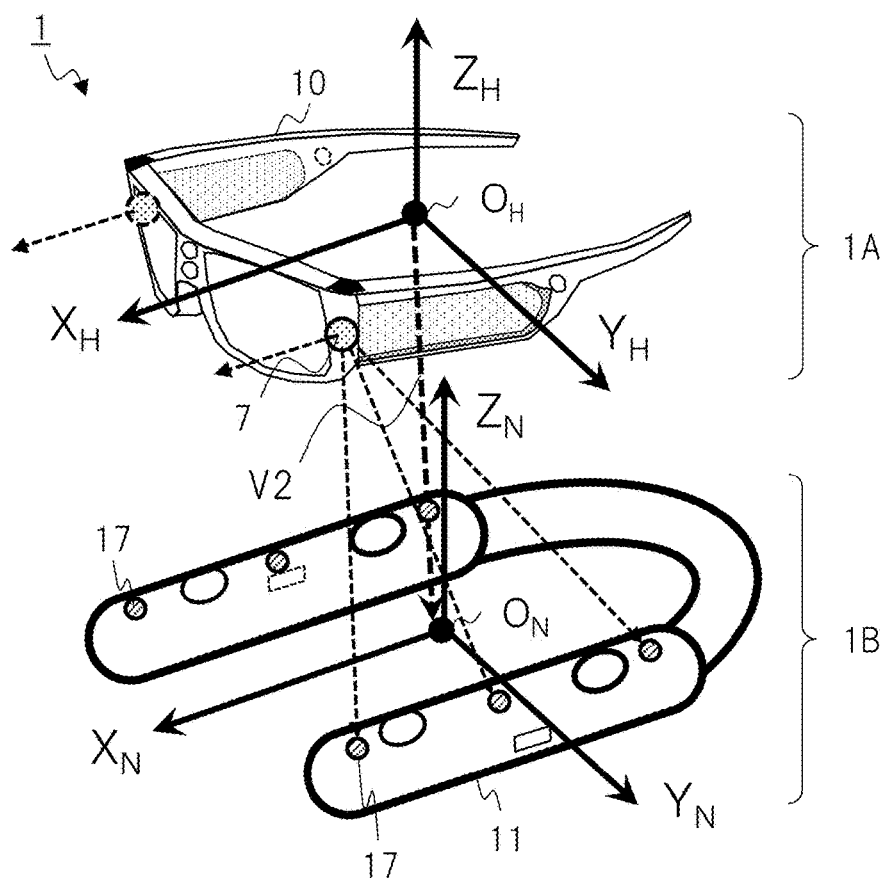
FIG. 12 is a view showing a configuration of an HMD according to a second embodiment of the present invention.

FIG. 12 shows a configuration of an HMD 1 according to a second embodiment. A distance measuring sensor 7, a camera 6, a display device 150, and the like are mounted on the head attached part 1A. A position/attitude sensor 70, a battery (main battery 242), a microphone 8, a speaker 9, and the like are mounted on the neck attached part 1B. In this example, the distance measuring sensor 7 of the head attached part 1A uses a combined type for normal distance measurement and for distance measurement of a positional relationship. The distance measuring sensor 7 is symmetrically arranged as two distance measuring sensors near right and left ends and on the front side of the housing 10, and distance-measures the plurality of markers 17 which are substantially below. Furthermore, in this example, three markers on each of the left and right housings 11 of the neck attached part 1B, that is, a total of six markers are arranged. The vector V2 is a vector representing the positional relationship to the origin $O_N$ of the neck coordinate system CN seen from the origin $O_H$ of the head coordinate system CH.

According to the HMD 1 of the second embodiment, the same effect as that of the first embodiment can be realized. However, from the viewpoint of the weight of the head attached part 1A, it is more advantageous to provide the distance measuring sensor 7 on the neck attached part 1B similarly to the first embodiment. As a modification example of the second embodiment, the head attached part 1A may be provided, as a separate body, with a second distance measuring sensor for normal distance measurement. The second distance measuring sensor may be provided on the neck attached part 1B. Further, as a modification example, the camera 6 may be mounted on the neck attached part 1B side.

Third Embodiment

An HMD according to a third embodiment will be described with reference to FIG. 13. Due to an influence of user's clothes and the like, the positional relationship between the head attached part 1A and the neck attached part 1B may not be optically measured by using the distance measuring sensor 7. In the third embodiment, a method capable of measuring the positional relationship is shown even in such a case.

Figure 13:
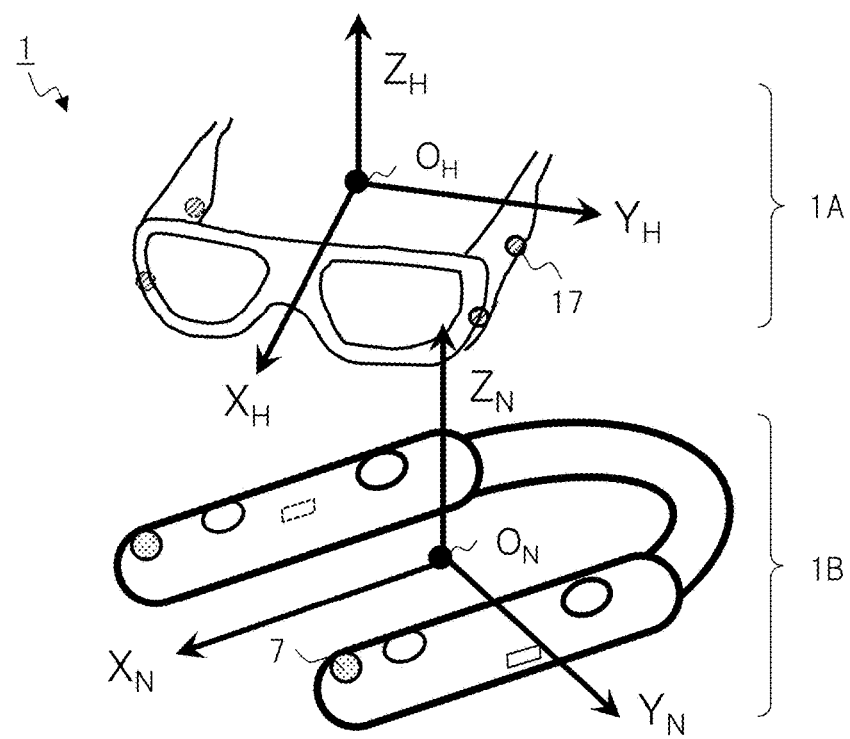
FIG. 13 is a view showing a configuration of an HMD according to a third embodiment of the present invention.

FIG. 13 shows a configuration of an HMD 1 according to a third embodiment. The HMD 1 is different from that of the first embodiment in a configuration point in which a position/attitude sensor 70 has sensors including an acceleration sensor 71 and a geomagnetic sensor 73 in the head attached part 1A and the neck attached part 1B.

First, a rotationally central position of the head attached part 1A as seen from the neck attached part 1B is determined according to an individual and is substantially constant, so that this is taken as a fixed position. A position of the HMD 1 is set in advance. Alternatively, the HMD 1 is set to a value at a time when the distance measuring sensor 7 or the like can optically measure its average rotationally central position. For example, if a rotational center of the head attached part 1A is set as the coordinate origin of the head coordinate system CH, a relationship between the coordinate systems is determined by obtaining a directional relationship between the coordinate systems. Next, a relationship between the directions of the respective coordinate systems is obtained. Since the gravitational acceleration can be measured by a 3-axis acceleration sensor which is the acceleration sensor 71, a relationship between directions in the vertical direction can be obtained from a difference between measured values of the respective coordinate systems in a gravitational acceleration direction. Then, regarding a difference between directions of horizontal planes of the head (corresponding head coordinate system CH) and the body trunk (corresponding neck coordinate system CN), the geomagnetic sensors 73 provided in both the head attached part 1A and the neck attached part 1B are used, thereby being able to determine a difference in an azimuth direction between both horizontal planes. The geomagnetic sensor may bring occurrence of a deviation from an absolute value of the azimuth direction due to an influence of the outside world, but can obtain relatively stably a relative value. From the above, the directional relationship between the head coordinate system CH and the neck coordinate system CN can be calculated in the same manner as that of the first embodiment.

As described above, in the third embodiment, a gravity acceleration direction in each coordinate system and a direction in geomagnetism, for example, the north direction, are used to calculate the directional relationship between the coordinate systems instead of the respective directions from the first measurement point toward the second measurement point and the third measurement point regarding the three measurement points described in the first embodiment. Consequently, in the third embodiment, even in a situation where the positional relationship between the head attached part 1A and the neck attached part 1B cannot be optically measured, the positional relationship can be estimated.

As described above, according to the third embodiment, the same effect as that of the first embodiment can be obtained from the viewpoint of emphasizing the advanced functions. As a modification example of the third embodiment, it may be configured not to include the distance measuring sensor 7.

The following is also possible as another modification example. The HMD 1 may be in a situation where the positional relationship between the neck attached part 1B and the head attached part 1A cannot be temporarily measured. In that case, since the HMD 1 cannot perform conversion using the positional relationship, it may be unable to display an image with reference to the neck coordinate system CN or an image with reference to the head coordinate system CH. In this case, as an exceptional handling processing, the HMD 1 may perform display that uses no positional relationship, for example, display of an image with reference to the head coordinate system CH or an image with reference to the neck coordinate system CN. Thereafter, when the positional relationship can be measured again, the HMD 1 stops the exceptional handling processing and returns to the original display.

Fourth Embodiment

A fourth embodiment will be described with reference to FIG. 14. An HMD according to a fourth embodiment has a configuration of mounting a wireless power-feeding function about power feeding between the head attached part 1A and the neck attached part 1B and performing wireless communication between the head attached part 1A and the neck attached part 1B.

Figure 14:
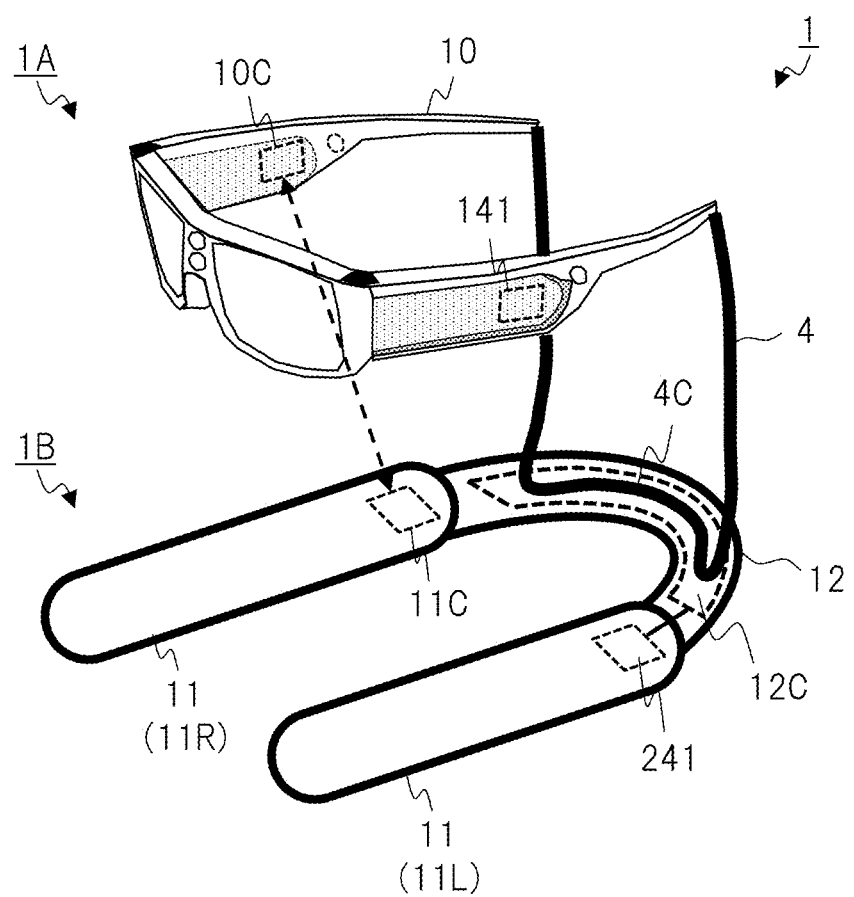
FIG. 14 is a view showing a configuration of an HMD according to a fourth embodiment of the present invention.

FIG. 14 shows a configuration example of the HMD 1 according to the fourth embodiment. The connecting line 4 is composed of one line, and has a loop shape by connection with the housing 10 of the head attached part 1A. One end of the connecting line 4 is connected to, for example, a back end on a left-side portion of the housing 10 of the head attached part 1A, and is connected to the power supply circuit 141 (FIG. 2) in the housing 10. The other end of the connecting line 4 is connected to, for example, a back end of a right-side portion of the housing 10. This power supply circuit 141 includes a power reception circuit for wireless power feeding.

A middle portion of the connecting line 4 is a portion placed in contact with the housing 12 of the neck attached part 1B, and mounts a power reception antenna portion 4C. A power transmission antenna unit 12C is mounted on the housing 12. The power transmission antenna unit 12C is connected to the power supply circuit 241 of the housing 11. The power supply circuit 241 includes a power transmission circuit for wireless power feeding. For example, coils are formed in the power transmission antenna unit 12C and the power reception antenna unit 4C, respectively. Wireless power feeding is performed between the power transmission antenna unit 12C and the power reception antenna unit 4C, which are in close proximity to each other, by an action of electromagnetic induction. Incidentally, a method of wireless power feeding is not limited.

A wireless communication circuit 10C corresponding to a wireless communication interface is mounted on, for example, the right-side part of the housing 10 of the head attached part 1A. A wireless communication circuit 11C is mounted on a part of the housing 11 of the neck attached part 1B, for example, a part of the right-side housing 11R. The HMD 1 realizes a function in which upper and lower portions cooperate with each other by appropriately performing wireless communication between the wireless communication circuit 10C of the head attached part 1A and the wireless communication circuit 11C of the neck attached part 1B. Incidentally, an antenna for wireless communication may be formed on or in the connecting line 4 or the housing 12.

Incidentally, a connection portion between the connecting line 4 and the housing 12 may be configured to be separated and fixed by the user. Since the connecting line 4 is flexible and a certain length or more thereof is ensured as a margin, the user can freely move his/her neck and head.

Fifth Embodiment

A fifth embodiment will be described with reference to FIG. 15. An HMD according to a fifth embodiment has a function related to the above-mentioned display control, and shows examples of display control of images corresponding to a state of the head and a state of the body trunk of the user.

[Display Control]

An HMD of a conventional example uses, as a display method of an image of a virtual object or the like, two standards of a world coordinate system of the outside world and a local coordinate system (head coordinate system CH in the first embodiment) aligned with the head. Alternatively, like an example of Patent Document 1, proposed is also use of two standards of the coordinate system aligned with the head and the coordinate system aligned with the body trunk (the neck coordinate system CN in the first embodiment). In contrast, the HMD1 of the fifth embodiment uses all three standards of the world coordinate system CW, the head coordinate system CH, and the neck coordinate system CN to control the image display in each coordinate system. Consequently, the HMD 1 realizes the advanced functions and improves the user convenience.

Incidentally, in a method of the non-transparent type display surface 5, there is also an immersive method in which the entire visual field of the user is a display for displaying a VR image. Even in that case, in an aspect in which the user moves a "virtual world" in the image, if the "virtual world" is interpreted as a "world" referred to in the present invention, the same display method can be configured and the same effect is also obtained. Therefore, the display method of the present invention includes both a transparent type and a non-transparent type (particularly an immersive type) unless otherwise specified. If a case of the immersive method is more specifically detailed, movement in the "virtual world" may be performed by a case of the actual movement of the HMD in the outside world or by a case of a control input by the controller (operating tool 2). Both can be regarded as movements intended by the user within the world.

In the HMD 1 of the fifth embodiment, the following three types of control are used in combination about display control including control of a position where an image is displayed on the display surface 5.

(1) Image display position control with reference to the world coordinate system CW. This display control is used in, for example, a case or the like of causing a virtual object for work support to be displayed at a position near an object in the outside world.

(2) Image display position control with reference to the head coordinate system CH. This display control is used in, for example, a case of causing images such as system information, menus, commands, and icons in the graphical user interface (GUI) of the HMD 1 to be displayed within a field of view corresponding to the user's head direction.

(3) Image display position control with reference to the neck coordinate system CN. Meanwhile, regarding the display of a certain type of virtual object, the display in the world coordinate system CW or the display in the head coordinate system CH may not be convenient. For example, display of work procedures and work tools, etc. can be mentioned. When this kind of virtual object is arranged at a fixed position with reference to, for example, the world coordinate system CW, it takes time and effort to rearrange the virtual object each time the user moves. Incidentally, the movement of the user here includes not only the movement of the user in the real space but also the movement of the user's viewpoint in the virtual space by the controller (operating tool 2) or the like.

Therefore, in the fifth embodiment, the arrangement with reference to the neck coordinate system CN is used for the display control of this kind of virtual object. That is, the HMD 1 arranges this kind of virtual object at a position aligned with the body trunk direction of the user. In a case of this arrangement, the virtual object is also displayed at a position following the movement of the user, so that time and effort for the rearrangement can be saved.

Meanwhile, in placing the above-mentioned virtual object at a position with reference to the head coordinate system CH, it is displayed following the movement of the user, but it is placed at a fixed position of a front visual field of the user, so that it may be difficult to see the front visual field. For example, when the virtual object is placed at a central position of the front visual field, it becomes difficult to see a work target(s) and work's hand. When the virtual object is placed at a position outside the central position of the front visual field, there is a limitation in that the virtual object becomes difficult to see or that a large-sized virtual object or a large number of virtual objects cannot be placed.

Therefore, in the fifth embodiment, display control with reference to the neck coordinate system CN is used for this kind of virtual object. That is, in this display control, a target virtual object is displayed so as to follow intentional movement of the user in the world coordinate system CW and match it with the body trunk direction of the neck attached part 1B and so as not to follow a change of the head direction. In this display control, the target virtual object is displayed so that a display position and direction with respect to the display surface 5 change according to the change of the head direction of the head attached part 1A with respect to the body trunk direction of the neck attached part 1B. This brings no limitation as mentioned above, and obtainment of an effect such as easier work. For example, the user can place a virtual object such as a work tool at a position avoiding a front direction where an actual work object(s) is located, and the user can place the large-sized virtual object or a large number of virtual objects in the field of view of the above-mentioned virtual object with no problem if the head direction is changed.

[Display Control Example (1)]

FIGS. 15 to 18 show display control examples with reference to the respective coordinate systems. First, (A) of FIG. 15 shows an example of the entire visual field 5A of the user who wears (attaches) the HMD 1. A FOV (field of view) 5B exists at a center of the entire visual field 5A, and a work object 5D on a work table 5C exists as an example of a real thing. The entire visual field 5A is the entire range which the user can visually recognize. The entire visual field 5A shows the entire visual field at a time when the user is standing toward the work target 5D and naturally faces the body trunk and his/her face toward a front. The FOV 5B shows a range or a display region in which a display object can be displayed on the display surface 5 of the transparent type HMD 1. A point P1 shows a central point of the FOV 5B. (A) is a state in which the work object 5D and the like can be seen through the display surface 5 from the user's point of view.

Incidentally, in a case of the non-transparent type HMD, the display object can be displayed by regarding the entire visual field 5A as a display region, and the FOV 5B in that case corresponds to a guide of an easily visibly recognized range in front of the user's head and both eyes. In a case of the non-transparent type display surface 5, the work object 5D or the like is displayed as a virtual object corresponding to a real thing by video see-through or simulation.

(B) shows an example of superimposedly displaying a display object such as a virtual object on the FOV 5B of the display surface 5 with respect to the entire visual field 5A of (A), and is set to a first state. An element(s) other than the real thing is a display object (corresponding image) such as a virtual object regardless of whether the HMD adopts a method of a transparent type or a non-transparent type. In this example, the display objects include system information 61, an HMD menu 62, a work description 63, and a work tool 64.

The system information 61 is information provided to the user by a system of the HMD 1 and is, for example, images representing states such as a radio field intensity, time, and a remaining battery level. Further, the HMD menu 62 is a GUI component for the user to input an instruction or the like and is a virtual object such as a HOME button. The system information 61 and the HMD menu 62 are examples of the display with reference to the head coordinate system CH, and are displayed at fixed positions in the FOV 5B. For example, the system information 61 is displayed in an upper-side area of the FOV 5B, and the HOME button, which is the HMD menu 62, is displayed in a lower-left area of the FOV 5B. The system information 61 and the like are displayed at the same positions in the entire visual field 5A and the FOV 5B even when the position and the direction of the HMD 1 are changed due to the movement or the like of the user.

The work description 63 is a virtual object for explaining work about the work object 5D to the user. The work description 63 is an example of display with reference to the world coordinate system CW, and is displayed at a fixed position near the work object 5D. The work description 63 is displayed at the same position in the world coordinate system CW even when the position and the direction of the HMD 1 changes due to the movement or the like of the user.

The work tool 64 is a virtual object such as a tool for supporting the work of the user. The work tool 64A displays a moving image, an animation, or the like that conveys the work procedure. The work tool 64B is provided with commands for operation. The work description 63 and the work tool 64 are generated by, for example, a work support application. The work tool 64 is an example of display with reference to the neck coordinate system CN, and is displayed at a position aligned with the body trunk direction of the user. When the positional relationship between the neck attached part 1B and the head attached part 1A changes, the work tool 64 changes its display position within the entire visual field 5A. Hereinafter, a change of the display of the work tool 64 with reference to the neck coordinate system CN will be described.

Figure 16:
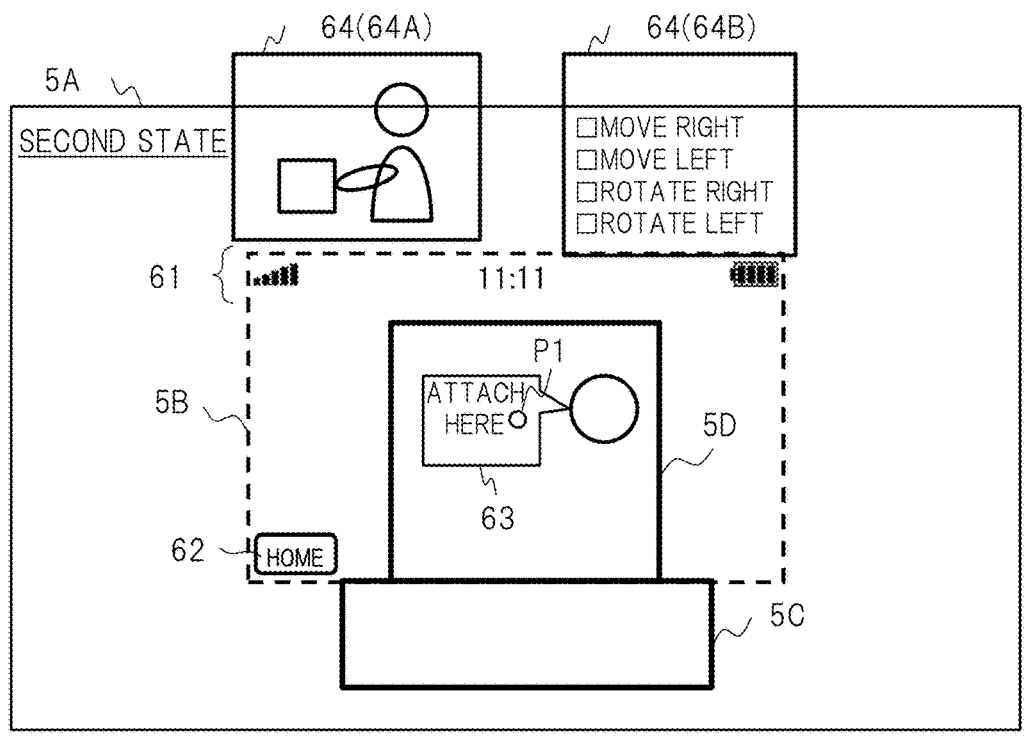
FIG. 16 is a view showing a second state of the first display control example in the HMD according to the fifth embodiment.

FIG. 16 shows a second state which is an example of a state changed from the first state of FIG. 15. FIG. 16 shows a state in which a front of the user's face is directed toward the work object 5D by the user turning the head diagonally downward while the direction of the user's body trunk is kept as it is. The work description 63 is present at the point P1 of the FOV 5B. The work tool 64 has moved upward in terms of the visual field and is completely out of the FOV 5B.

Figure 17:
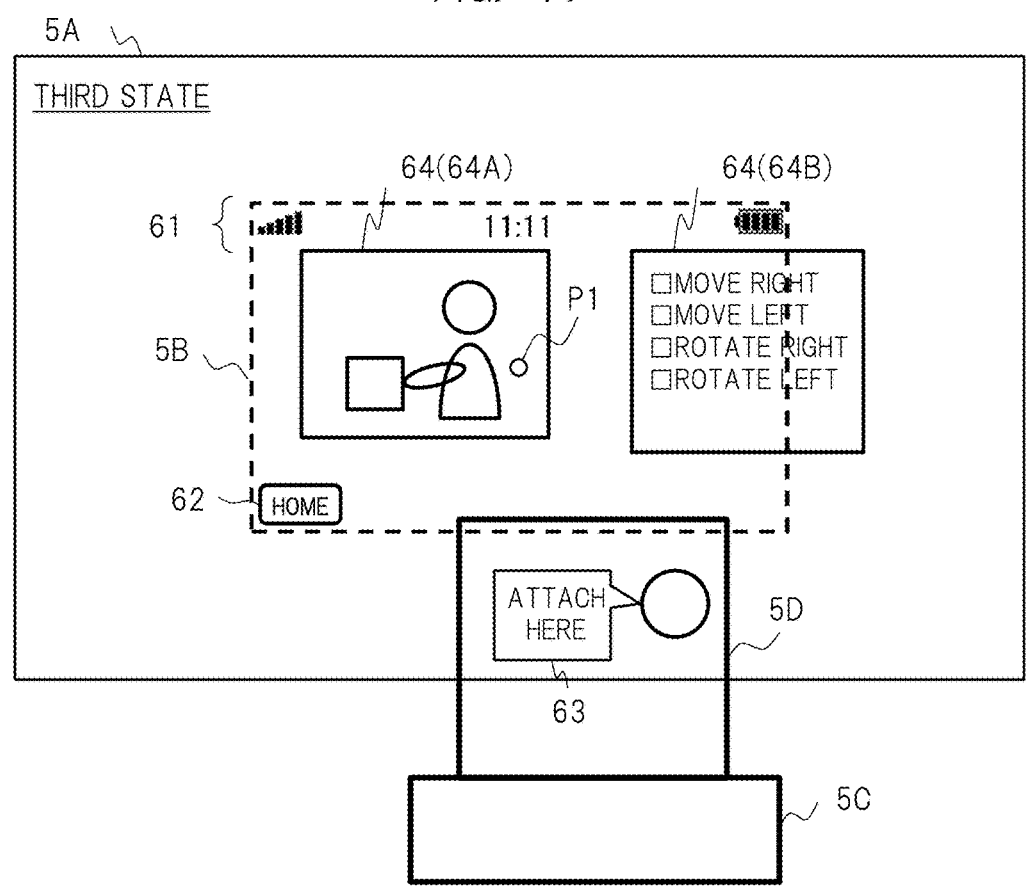
FIG. 17 is a view showing a third state of the first display control example in the HMD according to the fifth embodiment.

FIG. 17 shows a third state which is an example of a state changed from the first state of FIG. 15. FIG. 17 is a state in which the work tool 64 is directed to a lower-right direction in the entire visual field 5B and a left work tool 64A is accommodated in the FOV 5B by the user turning the face toward an upper-left direction while the direction of the user' body trunk is kept as it is. The work tool 64A is present at the point P1.

Figure 18:
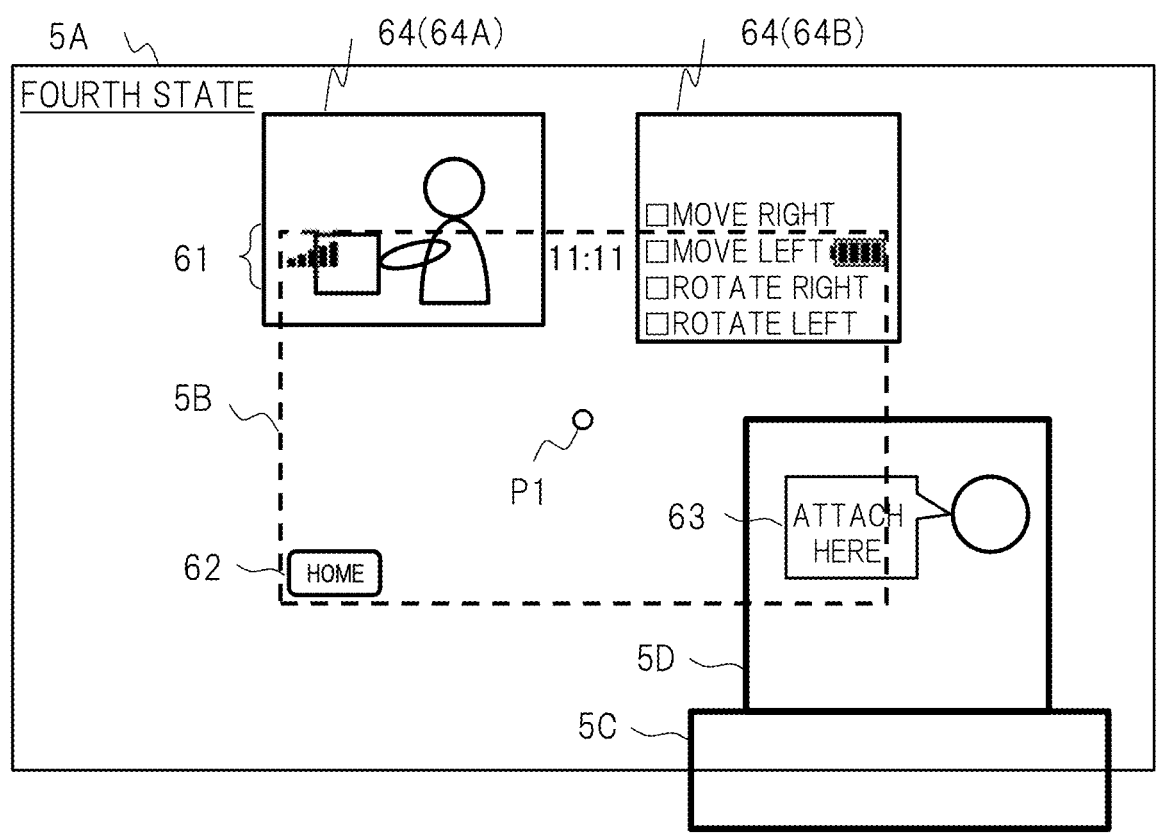
FIG. 18 is a view showing a fourth state of the first display control example in the HMD according to the fifth embodiment.

FIG. 18 shows a fourth state which is an example of a state changed from the first state of FIG. 15. FIG. 18 is a state in which the user turns the body trunk diagonally forward left without changing the direction of the face with respect to the body trunk. In this case, the work description 63, which is a display object with reference to the world coordinate system CW, is moving to the right within the entire visual field 5A. Meanwhile, since the work tool 64, which is a display object with reference to the neck coordinate system CN, is arranged so as to be aligned with the body trunk direction, the position is not changed within the entire visual field 5A. Such display with reference to the neck coordinate system CN is suitable for, for example, a case etc. where the user uses the same work tool 64 while moving.

Like the above-mentioned example, as a method of the display control of the virtual object in the HMD 1 of the fifth embodiment, the display of the virtual objects with reference to the respective coordinate systems of the world coordinate system CW, head coordinate system CH, and neck coordinate system CN can be displayed, selected, and used in combination based on data of the detected and calculated states. In particular, a display method with reference to the neck coordinate system CN can be displayed so as to follow the movements of the user and the HMD 1, but not to follow the changes in the directions of the head attached part 1A and the head with respect to the arrangement position of the virtual object. This makes it possible to perform detailed display according to the type and nature of the display object and to improve convenience such as preferable support of the user's work.

[Display Control Example (2)]

Figure 19:
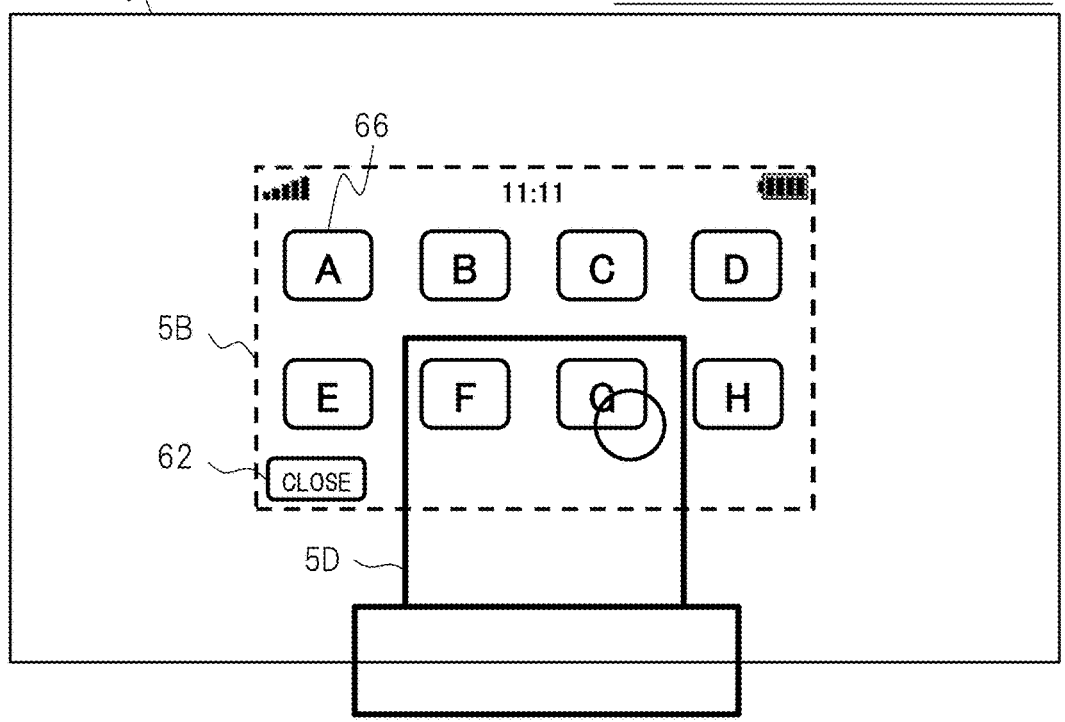
FIG. 19 is a view showing, as a second display control example, a display example of an application icon with reference to a head coordinate system in the HMD according to the fifth embodiment.
Figure 20:
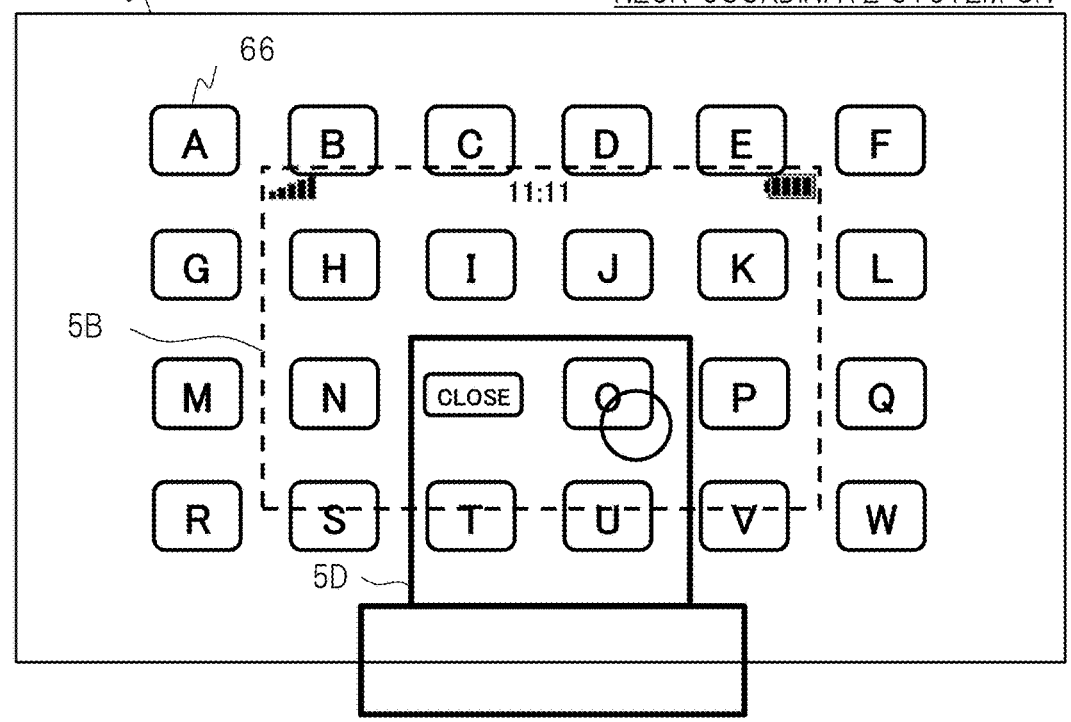
FIG. 20 is a view showing, as a second display control example, a display example of an application icon with reference to a neck coordinate system in the HMD according to the fifth embodiment.

FIGS. 19 to 20 show a second display control example of the fifth embodiment. FIG. 19 shows an example in which a plurality of application icons 66 are displayed in the FOV 5B on the display surface 5 of the HMD 1 by using a method with reference to the head coordinate system CH. In this example, the HMD 1 opens the home screen and displays a plurality of (8 in this example) application icons 66 in parallel on the home screen in response to the user selecting and executing the HOME button in the HMD menu 62 described above. The application icon 66 is an example of a virtual object that is a GUI component, and is an icon for controlling the display or the like of the corresponding application according to the selection execution by the user. Normally, the HMD 1 uses a method of displaying the application icon 66 at a fixed position in the FOV 5B with reference to the head coordinate system CH. When the user selects and executes a CLOSE button in the HMD menu 62, the HMD returns to an original display state, that is, a state where the application icon 66 is not displayed. For the virtual objects such as the application icon 66 and the like that are frequently used by the user, it is more convenient to display them at the fixed positions in the FOV 5B in this way.

Incidentally, display of a display object that interferes with the display of the application icon 66 may be temporarily stopped, or the application icon 66 may be superimposedly displayed on an upper layer. Further, for example, used may be a method in which an icon is placed on each page of a plurality of pages in the FOV 5B and a page change operation is accepted by a one-page change button or the like of the HMD menu 62. This makes it possible to increase the number of icons comprehensively displayable on the display surface 5.

Further, FIG. 20 shows an example of displaying the application icon 66 with reference to the neck coordinate system CN. The HMD 1 arranges a plurality of application icons 66 in parallel in the entire visual field 5A so as to aligned with the body trunk direction. Some of the application icons 66 are displayed in the FOV 5B. The application icon 66 displayed in the FOV 5B can be changed by the user changing the face's direction while the body trunk direction is kept as it is. For example, when the user turns the face to the upper left, the application icon 66 of "A" enters the FOV 5B. Thus, in the display method with reference to the neck coordinate system CN, all of a larger number of application icons 66 than a conventional application icon(s) can be visually recognized in the FOV 5B by changing the head direction with respect to the body trunk direction.

[Display Control Example (3)]

FIG. 21 shows a third display control example of the fifth embodiment. Further, used may be an application-icon arrangement method with reference to the world coordinate system CW. For example, since an application for operating a specific apparatus or device is often used at a location of the application, it is more convenient to place a virtual object of the application at a position near the application in the world coordinate system CW.

(A) of FIG. 21 shows an example in which an application icon 67 for controlling an application for operating a work object 5D is displayed at a fixed position near the work object 5D on the work table 5C in the world coordinate system CW within the entire visual field 5A.

Further, at that time, arrangement of the application icon 67 as a display object in the world coordinate system CW may be arrangement at a position and in a direction with reference to a direction in which the user exists. Furthermore, at that time, the application icon 67 may be arranged at a position avoiding being arranged on a line that connects the user and a work place of the work object 5D so as not to interfere with the user's work. In (B) of FIG. 21, an arrangement example of the application icon 67 is shown as a positional relationship seen from vertically upward. A direction 2101 of an arrow of a dash-single-dot line is a direction that connects a representative point of the user and HMD 1 and a representative point of the work object 5D and that corresponds to the head direction or the body trunk direction. A direction 2102 of a broken-line arrow is a direction that connects the representative point of the user and HMD 1 and an arrangement position of the application icon 67. The arrangement position of the application icon 67 is set, for example, at a right-hand neighbor position so as not to overlap with the work object 5D. An arrangement direction of the application icon 67 is aligned with the direction 2102.

[Display Control Example (4)]

Figure 22:
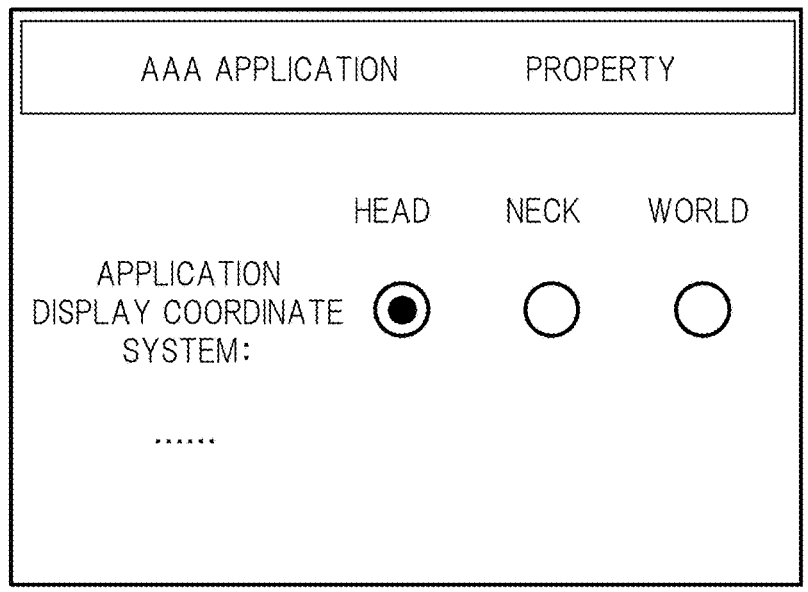
FIG. 22 is a view showing, as a fourth display control example, a setting example in a display coordinate system of an application in the HMD according to the fifth embodiment.

FIG. 22 shows a fourth display control example of the fifth embodiment. A display method with reference to each of the above-mentioned coordinate systems may be selectable according to a user's instruction or preset setting, or may be selected by HMD1's judgment. A display method may be selectable for each target virtual object, each type, and/or each application. FIG. 22 shows a setting example of a coordinate system used for displaying an application. FIG. 22 displays of a property (corresponding virtual object) of a certain application, and shows an example in which a coordinate system for displaying a virtual object such as an icon or tool of the application is selected from the head coordinate system CH, the neck coordinate system CN, and the world coordinate system CW and is settable.

Figure 23:
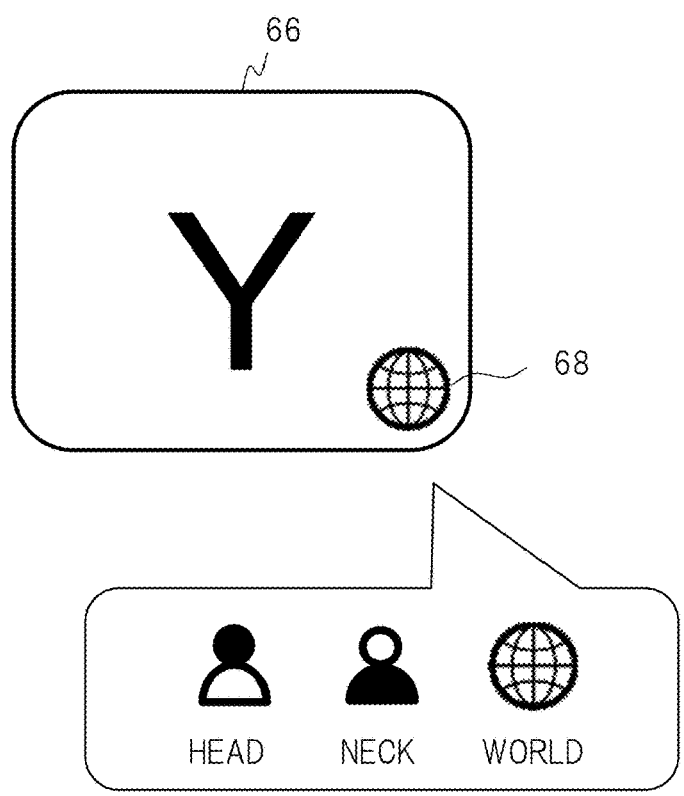
FIG. 23 is a view showing, as a fourth display control example, a setting example in a display coordinate system of an application icon in the HMD according to the fifth embodiment.

Further, FIG. 23 shows an example in which an image representing a display coordinate system is superimposedly displayed on a virtual object. In FIG. 23, an image 68 representing a display coordinate system is superimposedly displayed on a part of an application icon 66. The image 68 of this example is an image representing the world coordinate system CW, and indicates that the display coordinate system of the application icon 66 is the world coordinate system CW. The image 68 may always be displayed, or the image 68 may be displayed in a case or the like where the user provisionally selects the application icon 66 or inputs a predetermined instruction.

Furthermore, this image 68 representing the display coordinate system may be used as a control button of the display coordinate system. The HMD 1 is set to switch the display coordinate system of the corresponding virtual object among the head coordinate system CH, the neck coordinate system CN, and the world coordinate system CW according to selection execution of the image 68 by the user. For example, the image 68 may be a button that is cyclically switched among the three coordinate systems. For example, a selected state of the image 68 of the application icon 66 represents a display coordinate system at a time of starting the corresponding application. When the application icon 66 is selected and executed, the HMD 1 starts the corresponding application at a position of the display coordinate system according to the selected state of the image 68 at that time. That is, a virtual object such as a work tool is arranged at a position of the display coordinate system. In addition, a selecting operation of the image 68 of the application icon 66 may be used for immediately switching of the display coordinate system. For example, first, a state of the image 68 of the application icon 66 is in the head coordinate system CH, and is displayed like the example of FIG. 19 described above. Next, the state of the image 68 is changed to the neck coordinate system CN by the user's selecting operation of the image 68. At this time, the HMD 1 changes the coordinate system and the position, which the application icon 66 is arranged in and at, to a position in the neck coordinate system CN. The change of the coordinate system is possible based on the relationship between the coordinate systems described above.

(A) of FIG. 24 shows an example of switching a display coordinate system of a virtual object in the above-mentioned example of the work tool 64A. This example is an example of switching the display coordinate system according to user's selection execution for a virtual object such as a button arranged in the vicinity of the virtual object. In the work tool 64A, a control display object 64b that enables an operation such as switching of the display coordinate system is displayed at a position adjacent to a region of the display object 64a such as a moving image that conveys the work procedure, for example, in an upper-side area. The display object 64b includes a button 64c that enables the operation of switching the display coordinate system, a reduction button 64d indicated by "−", and an end button 64e indicated by "x".

The button 64c is a display coordinate system switching button, and may be a cyclic switching button similarly to the image 68 of FIG. 23. The button 64c includes an image (corresponding button) representing each coordinate system of the head coordinate system CH, the neck coordinate system CN, and the world coordinate system CW. The image corresponding to the currently selected display coordinate system is highlighted and displayed by, for example, being surrounded with a frame. The user can switch the display coordinate system of the work tool 64A by selecting and operating a button of the desired display coordinate system.

As an example of using the display coordinate system switching, the user changes the display coordinate system of a plurality of display objects arranged at a certain place in the world coordinate system CW to the neck coordinate system CN or the head coordinate system CH. The user can carry those display objects by moving from that place. Then, the user returns, at a moved place, the display coordinate system of those display objects to, for example, the world coordinate system CW. This makes it possible for the user to change the position of each display object in the world coordinate system CW with little time and effort.

Reduced display during transportation or for a display object(s) that does not need to be watched for a while brings efficient availability of a displace space. The HMD 1 changes a display size of the virtual object according to a user's instruction or the like. (B) of FIG. 24 shows an example in which the work tool 64A is reduced and displayed by operating the reduction button 64d of (A). One of the control buttons is an enlargement button 64f illustrated by a rectangle, and the work tool 64A can be returned to an original state by operating the enlargement button 64f. The present embodiment can adopt an aspect of not only the reduced display but also a change or the like of the virtual object by the icon. As described above, the function of switching the display coordinate system for each virtual object can enhance the convenience of the user.

[Display Control Example (5)]

Figure 25:
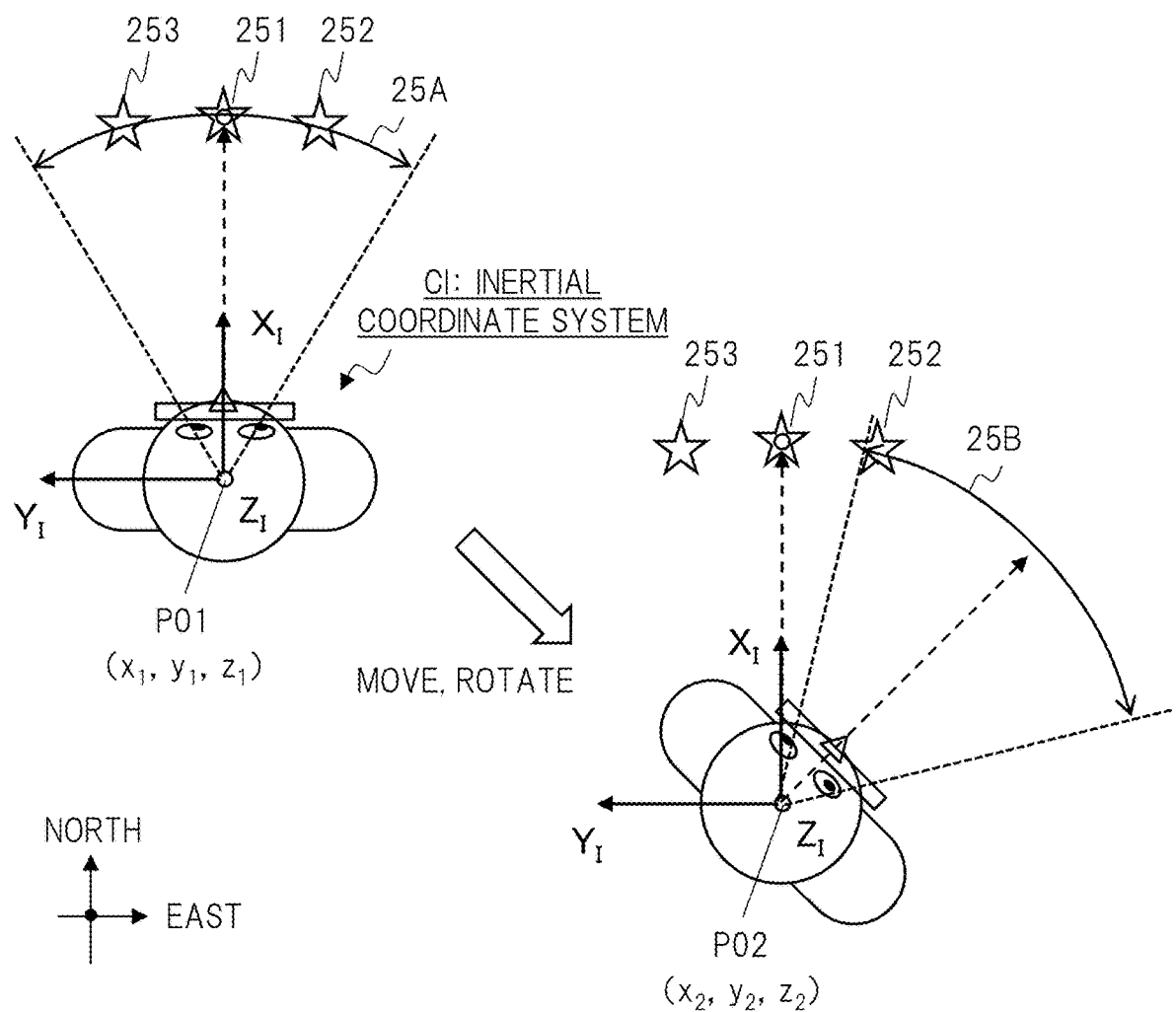
FIG. 25 is a view showing, as a fifth display control example, a concept of an inertial coordinate system in the HMD according to the fifth embodiment.

FIG. 25 shows a fifth display control example of the fifth embodiment. When the positional relationship between the head attached part 1A and the neck attached part 1B is unknown, a coordinate system used as an alternative to the neck coordinate system CN may be provided. Here, this coordinate system is called an inertial coordinate system CI. Specifically, this inertial coordinate system CI is a coordinate system configured so that the coordinate origin of the world coordinate system CW follows the movement of the head coordinate system CH (corresponding head attached part 1A) or the neck coordinate system CN (corresponding neck attached part 1B). For example, at a certain point, a display object placed at a position on the inertial coordinate system CI in the north direction seen from the user is always displayed at a position directed in the north direction with respect to the user regardless of the user's movement or a change of the user's direction.

Such a display method with reference to the inertial coordinate system CI is also a display method in which an arrangement position of the virtual object follows the movement of the user and the HMD 1 but does not follow the change in the direction of the head attached part 1A. If the front direction of the user's body (the body trunk direction of the neck coordinate system CN) is unknown, use of the inertial coordinate system CI has an effect in which the virtual objects desired to be placed in the vicinity of the user can be placed in a wide region around the user. This display method is applicable to any HMD that can measure the world coordinate system CW.

The HMD 1 switches the display coordinate system of the display object, which is arranged in the neck coordinate system CN, to the inertial coordinate system CI, for example, when the positional relationship between the head attached part 1A and the neck attached part 1B is temporarily unknown due to some causes and the direction of the neck coordinate system CN is unknown. At the time when the direction of the neck coordinate system CN becomes known again, the HMD 1 returns the display coordinate system of the display object from the inertial coordinate system CI to the neck coordinate system CN. Alternatively, the HMD 1 may select and switch the inertial coordinate system CI as the display coordinate system of the target virtual object or the like in response to the user's instruction (for example, the same operation as that of the fourth display control example).

FIG. 25 shows a concept of the inertial coordinate system CI. First, the user who wears (attaches) the HMD 1 is present at a position P01 in the world coordinate system CW. The directions of the user's body trunk and head are, for example, the north direction. Virtual objects 251, 252, 253, etc. can be seen in the FOV 25A corresponding to the north direction. Three axes of the inertial coordinate system CI are shown by ($X_I$, $Y_I$, $Z_I$). The axis $Z_I$ corresponds to a vertical direction, the axis $X_I$ corresponds to the north direction, and the axis $Y_I$ corresponds to the west direction. The HMD 1 changes the display coordinate system of the virtual object 251 or the like from, for example, the neck coordinate system CN to the inertial coordinate system CI at a predetermined opportunity.

A case where the user moves from the position P01 and changes the head direction so as to rotate is shown at a position P02. The head direction is rotated about 45 degrees from the north direction to the right side, for example. The origin of the inertial coordinate system CI has moved from the position P01 to the position P02. The virtual object 251 and the like are moving together with the inertial coordinate system CI, and are arranged at positions in the north direction while the positional relationship from the user's position P02 is maintained. In the FOV 25B in the head direction at the position P02, the virtual object 251 is not visible and the virtual object 252 is visible. The HMD 1 returns the display coordinate system of the virtual object 251 or the like from the inertial coordinate system CI to, for example, the neck coordinate system CN at a predetermined opportunity. As described above, introducing a new coordinate system makes it possible to control the display of the virtual objects under various conditions, and to further improve the convenience of the user.

Although the present invention has been specifically described above based on the embodiments, the present invention is not limited to the above-described embodiments and can be variously modified without departing from the scope.

EXPLANATION OF REFERENCE NUMERALS

1 . . . HMD; 1A . . . Head attached part; 1B . . . Neck attached part; 2 . . . Operating tool (remote control); 3A . . . Server; 3B . . . PC; 4 . . . Connecting line; 5 . . . Display surface; 6 . . . Camera; 7 . . . Distance measuring sensor; 8 . . . Microphone; 9 . . . Speaker; 10, 11, 12 . . . Housing; 14 . . . Operation input unit; and 17 . . . Marker.

The invention claimed is:

1. A head mounted display apparatus capable of displaying an image in a user's field of view, the apparatus comprising:
a head attached part attached to a user's head and having a display surface for displaying the image; and
a body trunk attached part communicating with the head attached part and attached to a part of a user's body trunk,
wherein the apparatus measures a relatively positional relationship between the head attached part and the body trunk attached part and, based on the positional relationship, grasps states including a position and a direction of the head attached part and states including a position and a direction of the body trunk attached part;
wherein the body trunk attached part has a body trunk sensor for detecting states including a position and a direction of the body trunk attached part, and
the body trunk attached part
measures the positional relationship,
calculates the states including the position and direction of the head attached part based on information detected by the body trunk sensor and the positional relationship, and
performs display control of the image, which uses the states including the position and the direction of the body trunk attached part, and display control of the image, which uses the states including the position and the direction of the head attached part.

2. The head mounted display apparatus according to claim 1,
wherein the body trunk attached part is attached near a user's neck or shoulder, and has housings arranged on right and left sides with respect to the user's neck or shoulder, and a housing arranged on a back side with respect to the user's neck or shoulder so as to connect the right-side and left-side housings.

3. The head mounted display apparatus according to claim 1,
wherein the body trunk attached part:
has at least a part of a sensor for detecting states including a position and a direction of the head mounted display apparatus, and
calculates the states including the position and the direction of the head mounted display apparatus based on information detected by the sensor and the positional relationship, and controls display of the image according to the states.

4. The head mounted display apparatus according to claim 1,
wherein at least one of the head attached part and the body trunk attached part has a distance measuring sensor for measuring the positional relationship.

5. The head mounted display apparatus according to claim 4,
wherein positions of a plurality of markers provided to a housing of the head attached part are measured from the distance measuring sensor that the body trunk attached part has, or positions of a plurality of markers provided to the housings of the body trunk attached part are measured from the distance measuring sensor that the head attached part has.

6. The head mounted display apparatus according to claim 1,
wherein the head attached part has a head sensor for detecting the states including the position and the direction of the head attached part, and
the head attached part measures the positional relationship, calculates the states including the position and the direction of the body trunk attached part based on information detected by the head sensor and the positional relationship, and performs display control of the image, which uses the states including the position and the direction of the head attached part, and display control of the image, which uses the states including the position and the direction of the body trunk attached part.

7. The head mounted display apparatus according to claim 1,
wherein the body trunk attached part has a main controller, and
the main controller grasps the states based on the positional relationship and transmits, to the head attached part, display data for the display control of the image according to the states.

8. The head mounted display apparatus according to claim 1, further comprising a connecting line that connects the body trunk attached part and the head attached part,
wherein the connecting line has two connecting lines arranged symmetrically with respect to the body trunk of the user.

9. The head mounted display apparatus according to claim 1,
wherein the body trunk attached part has main batteries at the right-side and left-side housings with respect to the body trunk of the user, and includes a connecting line that connects the body trunk attached part and the head attached part, power being fed from the body trunk attached part through the connecting line.

10. The head mounted display apparatus according to claim 1,
wherein the body trunk attached part has microphones and speakers at right-side and left-side housings with respect to the body trunk of the user.

11. The head mounted display apparatus according to claim 1, further comprising a connecting line that connects the body trunk attached part and the head attached part,
wherein wired communication is performed between a wired communication circuit of the body trunk attached part and a wired communication circuit of the head attached part through the connecting line.

12. The head mounted display apparatus according to claim 1,
wherein wireless communication is performed between a wireless communication circuit of the body trunk attached part and a wireless communication circuit of the head attached part.

13. The head mount display apparatus according to claim 1, further comprising a connecting line that connects the body trunk attached part and the head attached part,
wherein the head attached part has a power reception circuit for the wireless power feeding,
the connecting line has a power reception antenna unit for the wireless power feeding, and
the power transmission antenna unit and the power reception antenna are arranged close to each other, and the wireless power feeding is performed between the power transmission antenna unit and the power reception antenna unit.

14. The head mounted display apparatus according to claim 1,
wherein the body trunk attached part or the head attached part has a camera that captures a field of view of the user.

15. The head mounted display apparatus according to claim 1, further comprising:
as reference coordinate systems in arranging and displaying the image on the display surface, a world coordinate system, a body trunk coordinate system fixed to the body trunk attached part, and a head coordinate system fixed to the head attached part,
wherein the reference coordinate systems are selectable and settable for each of the images, each type of the images, or each of applications that handles the images.

16. The head mounted display apparatus according to claim 15, further comprising an inertial coordinate system as the reference coordinate system,
wherein the inertial coordinate system is a coordinate system in which its origin moves so as to follow a change in the position of the head attached part or the body trunk attached part and does not follow an arrangement position of the image with respect to a change in the directions of the head attached part and the body trunk attached part.

* * * * *